(12) United States Patent
Courchaine et al.

(10) Patent No.: US 12,044,897 B2
(45) Date of Patent: Jul. 23, 2024

(54) FIBER OPTIC CLOSURE AND ADAPTER FOR RECEPTACLE

(71) Applicant: AFL Telecommunications LLC, Duncan, SC (US)

(72) Inventors: Wilfred Courchaine, Moore, SC (US); William Miller, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 172 days.

(21) Appl. No.: 17/586,404

(22) Filed: Jan. 27, 2022

(65) Prior Publication Data

US 2022/0397735 A1    Dec. 15, 2022

Related U.S. Application Data

(60) Provisional application No. 63/209,655, filed on Jun. 11, 2021.

(51) Int. Cl.
  *G02B 6/44* (2006.01)
(52) U.S. Cl.
  CPC .................................. *G02B 6/4453* (2013.01)
(58) Field of Classification Search
  CPC .................................................... G02B 6/4453
  See application file for complete search history.

(56) References Cited

U.S. PATENT DOCUMENTS

| | | | |
|---|---|---|---|
| 3,068,961 A | 12/1962 | Andreas et al. | |
| 3,220,271 A | 11/1965 | Andreas et al. | |
| 3,331,331 A | 7/1967 | Irgens et al. | |
| 3,837,433 A | 9/1974 | Combs et al. | |
| 3,938,622 A | 2/1976 | Densow | |
| 4,000,790 A | 1/1977 | Seufer | |
| 4,034,830 A | 7/1977 | Mukai et al. | |
| 4,036,326 A | 7/1977 | Mukai et al. | |
| 4,353,163 A | 10/1982 | Overbury et al. | |
| 4,636,147 A | 1/1987 | Schweitzer et al. | |
| 4,644,658 A | 2/1987 | Dolata et al. | |
| 4,678,411 A | 7/1987 | Wieland | |
| 4,683,659 A | 8/1987 | Wunsch et al. | |

(Continued)

FOREIGN PATENT DOCUMENTS

| | | |
|---|---|---|
| CN | 1580552 A | 2/2005 |
| CN | 2892419 Y | 4/2007 |

(Continued)

*Primary Examiner* — Sung H Pak
*Assistant Examiner* — Hoang Q Tran
(74) *Attorney, Agent, or Firm* — Dority & Manning, P.A.

(57) ABSTRACT

A fiber optic closure including a receptacle, a bracket assembly, and an adapter is provided. The receptacle includes an interior formed between a plurality of sidewalls, a base wall, and an end wall. The bracket assembly extends along a transverse axis and includes a main body and a plurality of hinge assemblies. The plurality of hinge assemblies is spaced apart in a linear array along the transverse axis. The adapter is connectable to the receptacle and the bracket assembly and includes a pair of pivot arms connectable to the bracket assembly. The pair of pivot arms extends along the longitudinal axis from a lateral wall extending along the lateral axis. The lateral wall is attachable to the receptacle via a pair of arms extending along the longitudinal axis from the lateral wall.

20 Claims, 20 Drawing Sheets

(56) References Cited

U.S. PATENT DOCUMENTS

| | | |
|---|---|---|
| 4,764,093 A | 8/1988 | Nagashima |
| 4,801,253 A | 1/1989 | Johansson |
| 4,802,555 A | 2/1989 | Matsunaga et al. |
| 4,813,139 A | 3/1989 | Nagashima |
| 4,968,230 A | 11/1990 | Progl |
| 5,184,403 A | 2/1993 | Schliemann |
| 5,236,314 A | 8/1993 | Nagashima |
| 5,411,382 A | 5/1995 | Duensing |
| 5,787,854 A | 8/1998 | Uhlig et al. |
| 7,033,149 B2 | 4/2006 | Lügger et al. |
| 9,903,397 B2 | 2/2018 | Takayanagi et al. |
| 10,814,517 B2 | 10/2020 | Suzuki et al. |
| 2005/0025636 A1 | 2/2005 | Durr |
| 2015/0375416 A1 | 12/2015 | Haneda et al. |

FOREIGN PATENT DOCUMENTS

| | | |
|---|---|---|
| CN | 102812612 A | 12/2012 |
| CN | 204322203 U | 5/2015 |
| CN | 204367083 U | 6/2015 |
| CN | 105371087 A | 3/2016 |
| CN | 205438783 U | 8/2016 |
| CN | 106106033 A | 11/2016 |
| CN | 206442841 U | 8/2017 |
| CN | 207841595 U | 9/2018 |
| CN | 109664373 A | 4/2019 |
| CN | 109968458 A | 7/2019 |
| CN | 110131560 A | 8/2019 |
| CN | 209394795 U | 9/2019 |
| CN | 210567447 U | 5/2020 |
| CN | 211371896 U | 8/2020 |
| CN | 214369214 U | 10/2021 |
| DE | 1117292 B | 11/1961 |
| DE | 1861246 U | 10/1962 |
| DE | 1191954 B | 4/1965 |
| DE | 1195462 B | 6/1965 |
| DE | 2533222 A1 | 3/1976 |
| DE | 3721643 A1 | 1/1989 |
| DE | 9110329 U1 | 10/1991 |
| DE | 9203378 U1 | 4/1992 |
| DE | 4142918 A1 | 12/1992 |
| DE | 19808887 A1 | 9/1999 |
| DE | 20006638 U1 | 8/2001 |
| DE | 102004036555 A1 | 3/2005 |
| DE | 10191359 B4 | 9/2013 |
| DE | 102015010410 A1 | 2/2016 |
| DE | 102018008073 A1 | 4/2019 |
| EP | 0560201 B1 | 9/1995 |
| WO | WO198200508 A1 | 2/1982 |
| WO | WO199706359 A1 | 2/1997 |
| WO | WO199945244 A1 | 9/1999 |
| WO | WO200177572 A1 | 10/2001 |
| WO | WO2014119174 A1 | 8/2014 |
| WO | WO-2019222148 A2 * | 11/2019 ........... G02B 6/4442 |
| WO | WO2021219698 A1 | 11/2021 |

\* cited by examiner

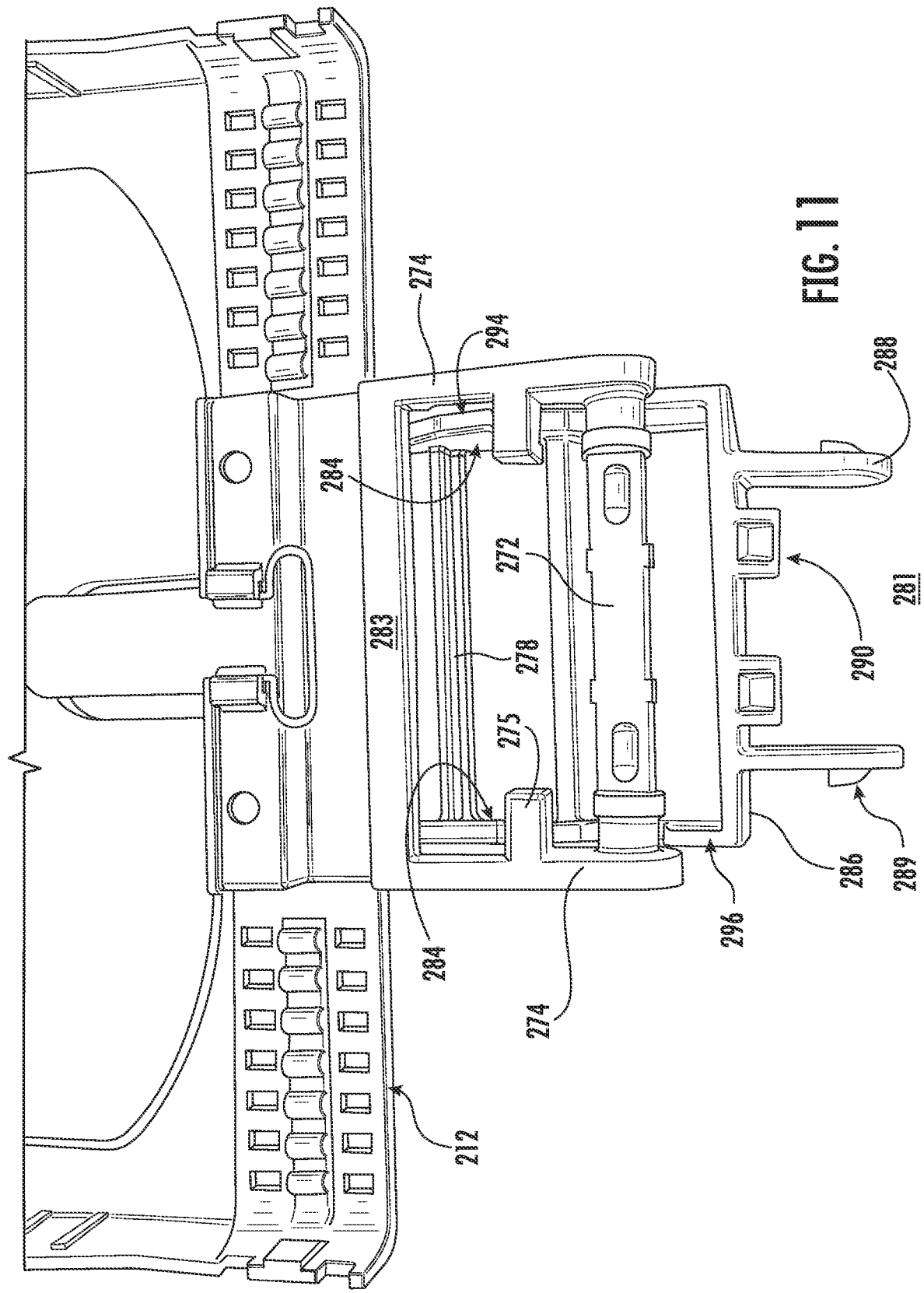

FIBER OPTIC CLOSURE AND ADAPTER FOR RECEPTACLE

FIELD

The present disclosure relates generally to closures, such as for fiber optic cable connections, and more specifically to improved organizer assemblies for fiber optic closures.

BACKGROUND

Certain closures are utilized in outdoor environments to facilitate the connection of transmission cables such as fiber optic cables. Such closures may include "butt" closures or "domed" closures for fiber optic cable connections. The cables enter the closure through a sealed base, and connection of the cable elements occurs within the closure. In the case of fiber optic cables, spliced-together optical fibers are held within the closure.

Many fiber organizer assemblies utilized in known closures generally have edges that can cause buffer tubes to kink if they are pulled over these edges. Further, in many cases, trays of the organizer assemblies must be held in the vertical or up position while other trays are being populated with fiber and while splicing is being done. Still further, splice modules utilized in such trays provide limited flexibility with respect to the types of splices and/or other components that can be held therein.

Structures and methods for preparing trays for splicing and storing trays and other internal surfaces of closures may provide some degree of cable and fiber organization but fail to mitigate, or inadequately mitigate, damage related to rubs, abrasion, compression, or tension at the cables. Known methods and structures may utilize tie wraps, rolled foam, or hard plastic tubes, which may lead to undesired wear or rubbing at the cable. The outcome of such methods and structures may be dependent on the user, which allows for inconsistent results among users.

As such, methods and structures that reduce or mitigate wear, or furthermore reduce preparation time, of trays for splicing and cable routing would be advantageous. Furthermore, methods and structure that reduce inconsistency between users, or improve consistency between users, would be advantageous. Still further, improved organizer structures for use with closures would be advantageous. Specifically, organizer structures which address one of more of the above-stated deficiencies would be advantageous.

BRIEF DESCRIPTION

Aspects and advantages of the invention will be set forth in part in the following description, or may be obvious from the description, or may be learned through practice of the invention.

An aspect of the present disclosure is directed to a fiber optic closure including a receptacle, a bracket assembly, and an adapter is provided. The receptacle includes an interior formed between a plurality of sidewalls, a base wall, and an end wall. The bracket assembly extends along a transverse axis and includes a main body and a plurality of hinge assemblies. The plurality of hinge assemblies is spaced apart in a linear array along the transverse axis. The adapter is connectable to the receptacle and the bracket assembly and includes a pair of pivot arms connectable to the bracket assembly. The pair of pivot arms extends along the longitudinal axis from a lateral wall extending along the lateral axis. The lateral wall is attachable to the receptacle via a pair of arms extending along the longitudinal axis from the lateral wall.

Another aspect of the present disclosure is directed to a fiber optic closure. The closure includes an organizing tray including a plurality of sidewalls extending along a longitudinal axis between a first end and a second end. The first end forms an open end such that a cable is extendable to or from an interior of the organizing tray. The organizing tray includes a base wall extending from the plurality of sidewalls along the longitudinal axis and a lateral axis. The base wall forms a plurality of apertures at the first end. The organizing tray includes an end wall extending along the lateral axis between the plurality of sidewalls. The organizing tray forms the interior between the plurality of sidewalls, the base wall, and the end wall. The organizer tray is rotatable between a first position and a second position. The organizing tray is aligned along the longitudinal axis in the first position. The organizing tray is aligned along the transverse axis or an angle between the longitudinal axis and the transverse axis in the second position. The organizing tray includes a pair of arms extending along the longitudinal axis from a rear end of the organizing tray. A bracket assembly is extending along a transverse axis. The bracket assembly includes a main body and a plurality of hinge assemblies. The plurality of hinge assemblies is spaced apart in a linear array along the transverse axis. Each hinge assembly includes a depression. An adapter is connectable to the organizing try and the bracket assembly. The adapter includes a pair of pivot arms connectable to the bracket assembly. The pair of pivot arms is extending along the longitudinal axis from a lateral wall extending along the lateral axis. The lateral wall is attachable to the organizer tray via a pair of arms extending along the longitudinal axis from the lateral wall. The pair of pivot arms includes a protrusion receivable at the depression at the hinge assembly. The pair of arms of the organizing tray is positioned outward along the lateral axis of the pair of arms of the adapter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which:

FIG. 11 is a top-down view of a portion of the closure disconnected from the bracket assembly, in accordance with embodiments of the present disclosure;

DETAILED DESCRIPTION

Figure 1:
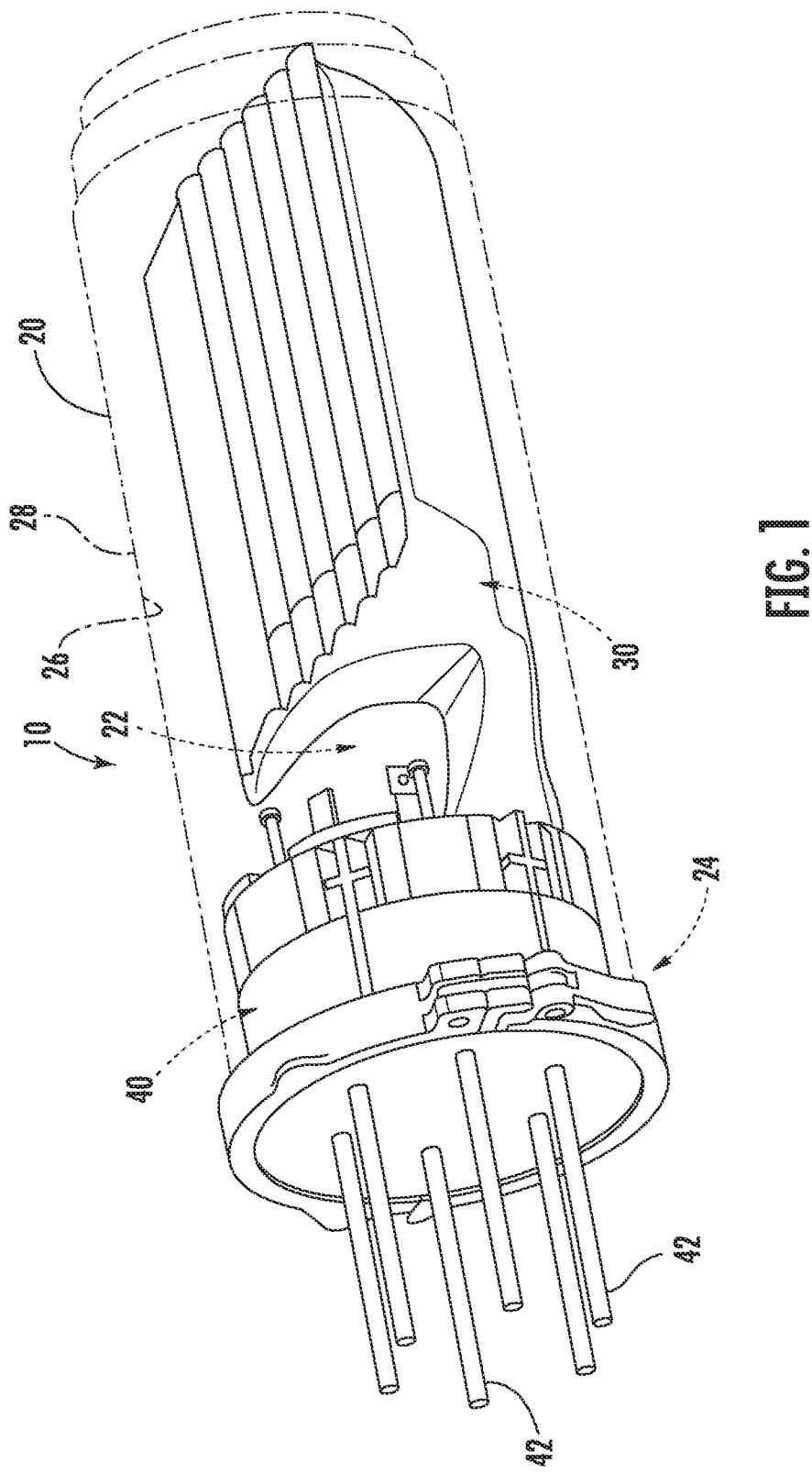
FIG. 1 is a perspective view of a closure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, embodiments of closures 10 and organizer assemblies in accordance with the present disclosure are provided. Closures 10 in accordance with the present disclosure, and in particular the organizer assemblies and tray organizer assemblies, thereof, may advantageously provide improved routing features which reduce kinking and attenuation risks. Certain embodiments of closure 10 may form a butt closure or domed closure for fiber optic cable connections. Receptacles, such as closures 10, organizer baskets 110, 150, or trays 200 thereof in accordance with the present disclosure may advantageously provide improved features for securing and positioning cables 42 at and through organizer trays and baskets in a variety of positions. Adapter structures, such as adapter 280, 380 provided herein, may advantageously allow efficient and effective fiber-populating, fiber splicing, improve cable routing consistency, allow for installation, implementation, and access of a variety of tray geometries to fit and rotate at the closure, or position the rotatable receptacles away such as to reduce kinking, binding, or interference of cables extending into and out of the receptacle.

Referring now to FIG. 1, a closure 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

FIGS. 2 through 14 illustrate various embodiments of organizer assemblies 30 and components thereof in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106.

Figure 2:
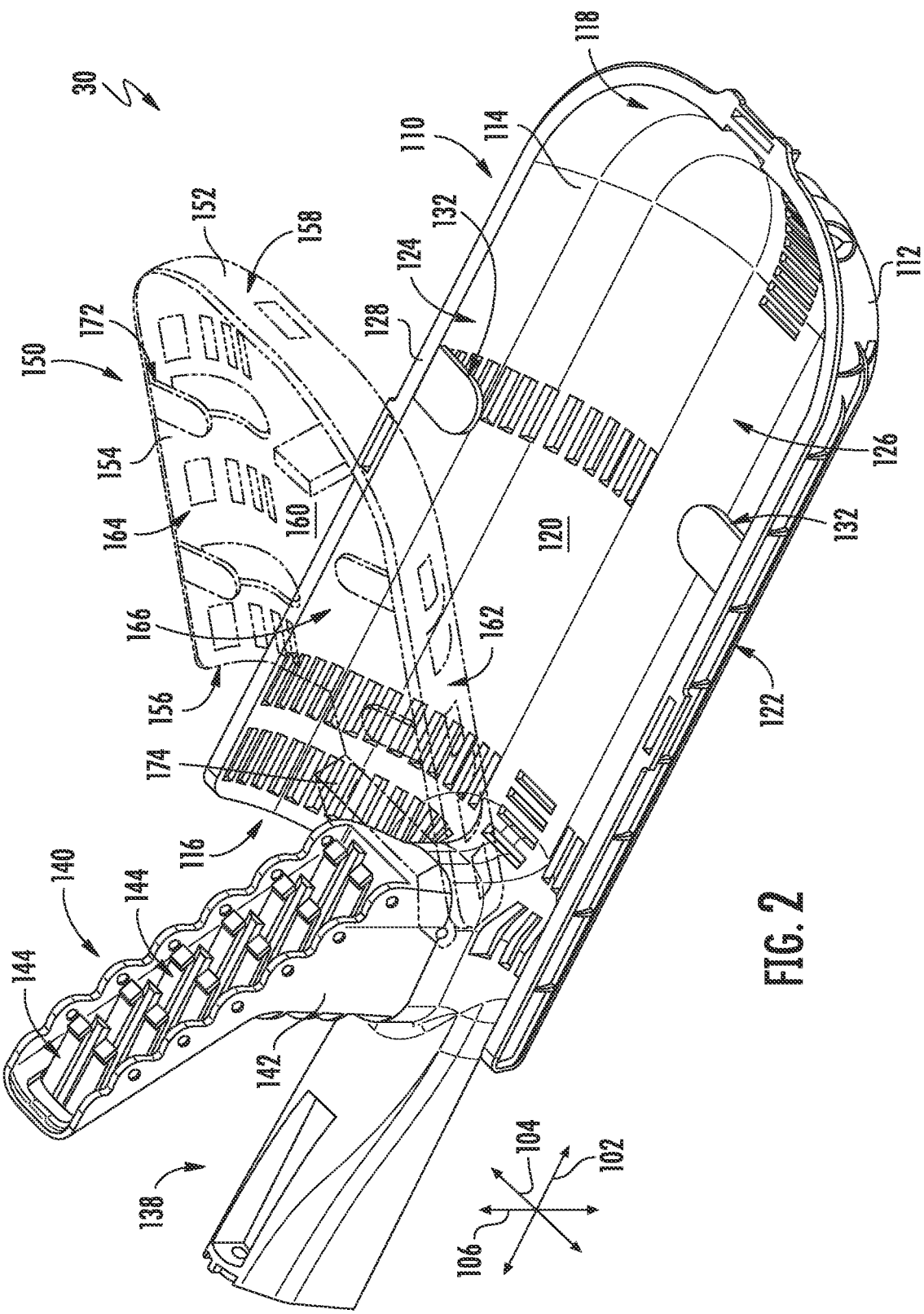
FIG. 2 is a perspective view of an organizer assembly, with a secondary basket connected thereon, in accordance with embodiments of the present disclosure.
Figure 3:
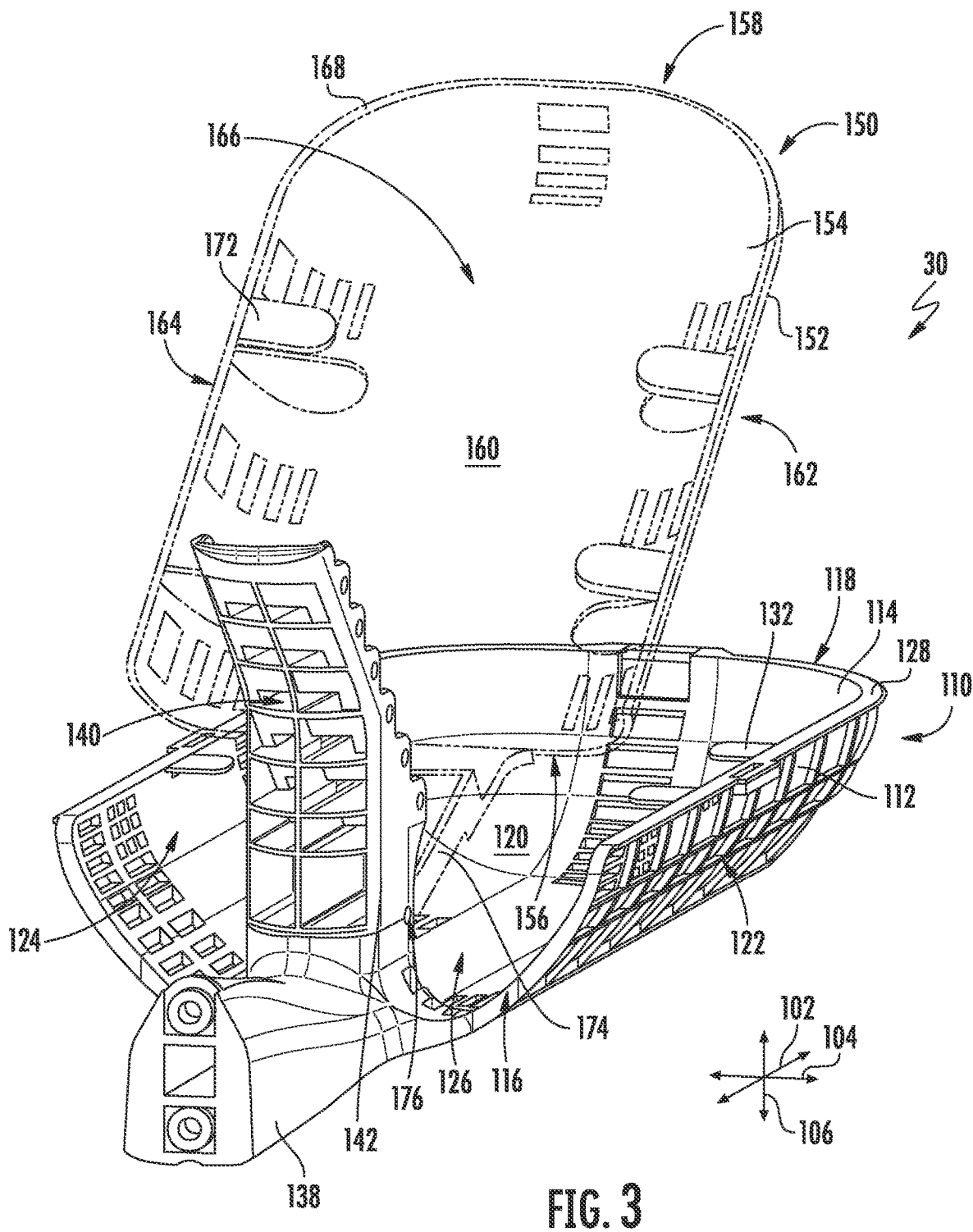
FIG. 3 is a rear perspective view of an organizer assembly, with a secondary basket connected thereon, in accordance with embodiments of the present disclosure.
Figure 4:
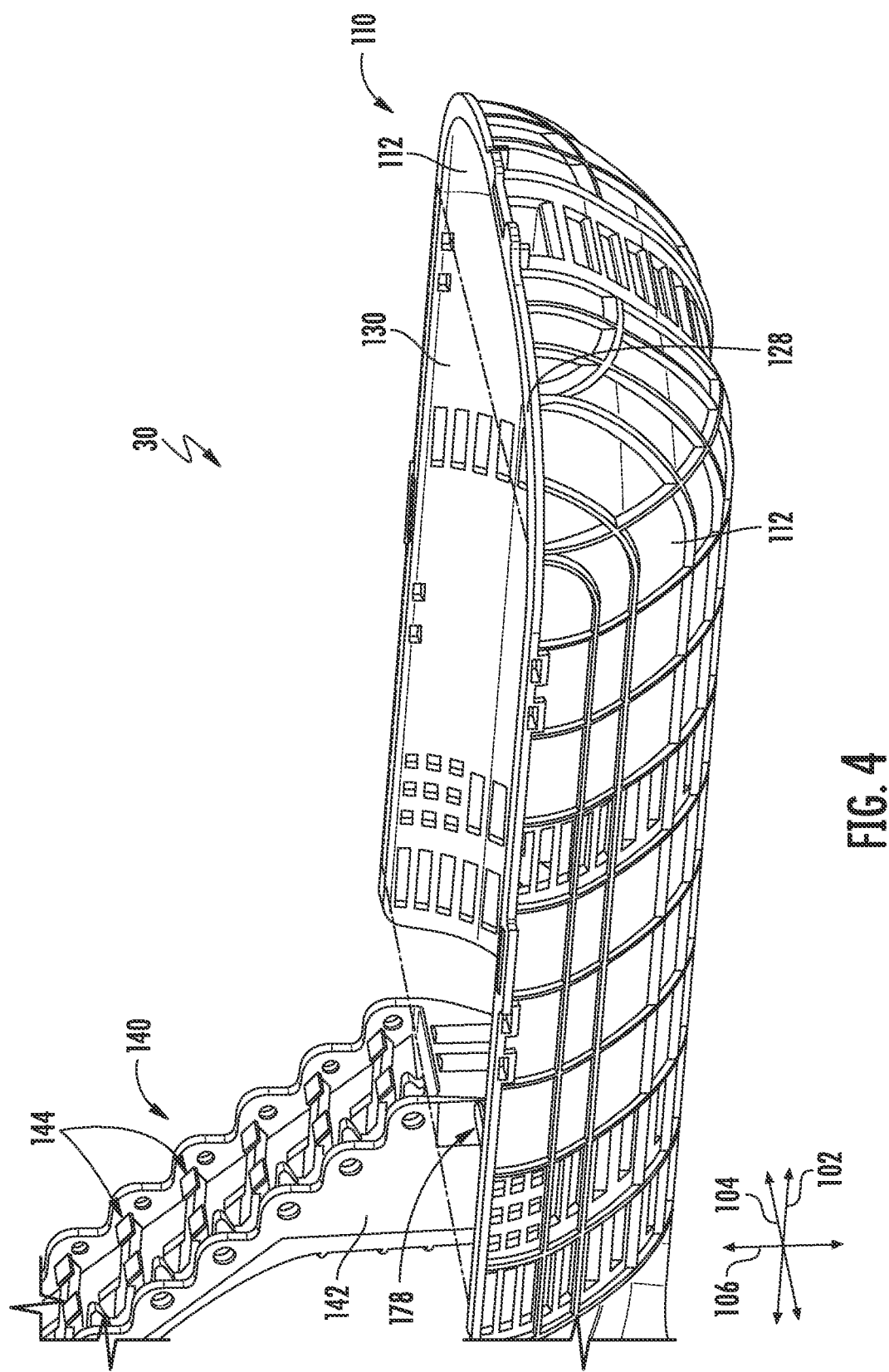
FIG. 4 is a perspective view of an organizer assembly, with a cover plate provided thereon, in accordance with embodiments of the present disclosure.

Referring in particular to FIGS. 2 through 4, organizer assemblies 30 in accordance with the present disclosure may include a primary basket 110. The primary basket 110 generally forms at least a portion of the base exterior of the organizer assembly 30, and includes an exterior surface 112 and an interior surface 114. The primary basket 110 may extend along the longitudinal axis 102 between a first end 116 and a second end 118. The first end 116 may be an open end, as shown, such that cables 42 or transmission elements thereof being directed along and parallel to the longitudinal axis 102 can enter or exit an interior 120 of the primary basket 110 through the first end 116. The second end 118 may be a closed end, as shown, such that cables 42 or transmission elements thereof being directed along and parallel to the longitudinal axis 102 cannot enter an interior 120 of the primary basket 110 through the second end 118, and instead encounter a surface of the primary basket 110.

The primary basket 110 may further extend along the lateral axis 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the closure 10 and organizer assembly 30 thereof.

Primary basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the primary basket 110, such as along the sides 122, 124 and second end 118.

In some embodiments, as illustrated in FIG. 4, a cover plate 130 may be provided. Cover plate 130 may be removably positioned on the basket 110, such as on the lip 128 thereof. Hook-and-loop fasteners or other suitable fastening apparatus may be utilized to removably fasten the cover plate 130 to the basket 110. Cover plate 130 may protect and help to secure portions of cables 42 and transmission elements thereof which are disposed in and routed through the interior 120 of basket 110.

In some embodiments, basket 110 may further include a plurality of retainer tabs 132, each of which extends from the basket 110 into the interior 120. The tabs 132 may be connected to the basket 110 at the upper edge of the basket 110, such as adjacent the lip 128. Further, in exemplary embodiments, the tabs 132 are removable. In some embodiments, for example, the tabs 132 may be removed when a secondary basket (as discussed herein) is connected. Tabs 132 may generally assist in routing and retaining cables 42 and transmission elements in the interior 120 during assembly, splicing, etc., thereof.

A connector shaft 138 may extend from the first end 116 along the longitudinal axis 102, such that at least a portion of the connector shaft 138 is exterior to the primary basket 110. The connector shaft 138 may connect to the base 40, thus connecting the organizer assembly 30 and base 40 together.

Referring now in particular to FIGS. 2 through 4 and 6 through 8, a bracket assembly 140 may extend along the transverse axis 106 from the primary basket 110, such as at the first end 116. Bracket assembly 140 may include a main body 142 and a plurality of hinge assemblies 144. The hinge assemblies 144 may be spaced apart in a linear array along the transverse axis 106. In exemplary embodiments, the hinge assemblies 144 are stepped along the transverse axis 106. In these embodiments, the linear array of the hinge assemblies 144 is angled relative to the transverse axis 106, rather than being directed along or parallel to the transverse axis 106. At least the portion of the main body 142 which includes the hinge assemblies 144 may also be so angled. Such angle may be between the transverse axis 106 and the longitudinal axis 102, as shown.

As shown in FIGS. 2 and 3, organizer assemblies 30 in accordance with the present disclosure may include a secondary basket 150 which may be rotatably and removably connectable to the bracket assembly 140. FIGS. 2 and 3 illustrate the secondary basket 150 rotatably connected to the bracket assembly 140. In exemplary embodiments, the secondary basket 150 may be connected to the bracket assembly 140 below the plurality of hinge assemblies 144 along the transverse axis 106, such as between the plurality of hinge assemblies 144 (such as the lower-most hinge assembly 144) and the interior surface 114 of the primary basket 110 along the transverse axis 106. The secondary basket 150 may be rotatable between a first position wherein the secondary basket 150 is aligned along the longitudinal axis 102 and a second position wherein the secondary basket 150 is aligned along the transverse axis 106 or at an angle between the longitudinal axis 102 and transverse axis 106 (as shown in FIGS. 2 and 3). In exemplary embodiments, the secondary basket 150 may be removable, such that it can be utilized as needed for cable 42 (and transmission elements thereof) routing and set aside/discarded when not needed.

The secondary basket 150 includes an exterior surface 152 and an interior surface 154. The secondary basket 150 may extend (such as along the longitudinal axis 102 when in the first position) between a first end 156 and a second end 158. The first end 156 may be an open end, as shown, such that cables 42 or transmission elements thereof being directed along and parallel to the longitudinal axis 102 can enter or exit an interior 160 of the secondary basket 150 through the first end 156, when the secondary basket 150 is in the first position. The second end 158 may be a closed end, as shown, such that cables 42 or transmission elements thereof being directed along and parallel to the longitudinal axis 102 cannot enter an interior 160 of the secondary basket 150 through the second end 158, and instead encounter a surface of the primary basket 110, when the secondary basket 150 is in the first position.

The secondary basket 150 may further extend along the lateral axis 104 between a first side portion 162 and a second side portion 164, both of which may be closed (as discussed above with respect to second end 118) and extending from a base portion 166. The base portion 166 extends along the longitudinal axis and the lateral axis. In exemplary embodiments, a length between the first end 156 and second end 158 is greater than a length between the first side 162 and the second side 164. Further, in exemplary embodiments, the secondary basket 150 is curved at transitions from the base portion 166 to end walls at the closed second end 158 (second end portion 158), the closed first side portion 162, the closed second side portion 164, and curved at transitions between the closed second end portion 158 and closed first side portion 162, and/or the closed second end portion 158 and closed second side portion 164.

In exemplary embodiments, the area of the interior 160 may be less than the area of the interior 120, the length between the first end 156 and second end 158 may be less than the length between the first end 116 and second end 118, and/or the length between the first side 162 and second side 164 is less than the length between the first side 122 and second side 124, such that the secondary basket 150 can fit at least partially within the primary basket 110 (such as the interior 120 thereof).

Secondary basket 150 may further include an upper peripheral lip 168, which may extend between the first end 156 and second end 158, such as on the sides 162, 164, and may further extend between the sides 162, 164, such as along the closed second end 158. For example, the lip 168 may extend along an upper edge (along the traverse axis 106) of the secondary basket 150, such as along the sides 162, 164 and second end 158.

In particular embodiments, basket 150 include a plurality of retainer tabs 172, each of which extends from the basket 150 into the interior 160. The tabs 172 may be connected to the basket 150 at the upper edge of the basket 150, such as adjacent the lip 168. Tabs 172 may generally assist in routing and retaining cables 42 and transmission elements in the interior 160 during assembly, splicing, etc., thereof.

One or more connector arms 174 may extend from the first end 156 (such as along the longitudinal axis 102 when the secondary basket 150 is in the first position). The connector arms 174 may be removably connected to the bracket assembly 140, thus rotatably connecting the secondary basket 150 thereto. For example, protrusions 176 provided on the arms 174 may be inserted in depressions 178 defined in the main body 142 to rotatably connect the secondary basket 150 thereto.

Referring again to FIGS. 2 through 4 and 6 through 8, each hinge assembly 144 may include at least one positioning tab 180 and at least one release tab 182. In some embodiments, for example, each hinge assembly 144 may include two positioning tabs 180 and a release tab 182, with the release tab 182 disposed between the positioning tabs 180 along the lateral axis 104. Each positioning tab 180 may be a generally tapered protrusion extending along the transverse axis 106 from the main body 142. Each release tab 182 may extend along the longitudinal axis 102 from the main body 142, and may thus protrude from the main body 142 farther than the positioning tab(s) 180 along the longitudinal axis 102.

Each bracket assembly 144 may further include one or more depressions 184 (which may for example be through-holes) defined in the main body 142.

Referring now to FIGS. 5 through 8 and 12 through 14, organizer assemblies 30 in accordance with the present disclosure may further include one or more organizer trays 200, such as in exemplary embodiments a plurality of organizer trays 200.

Figure 5:
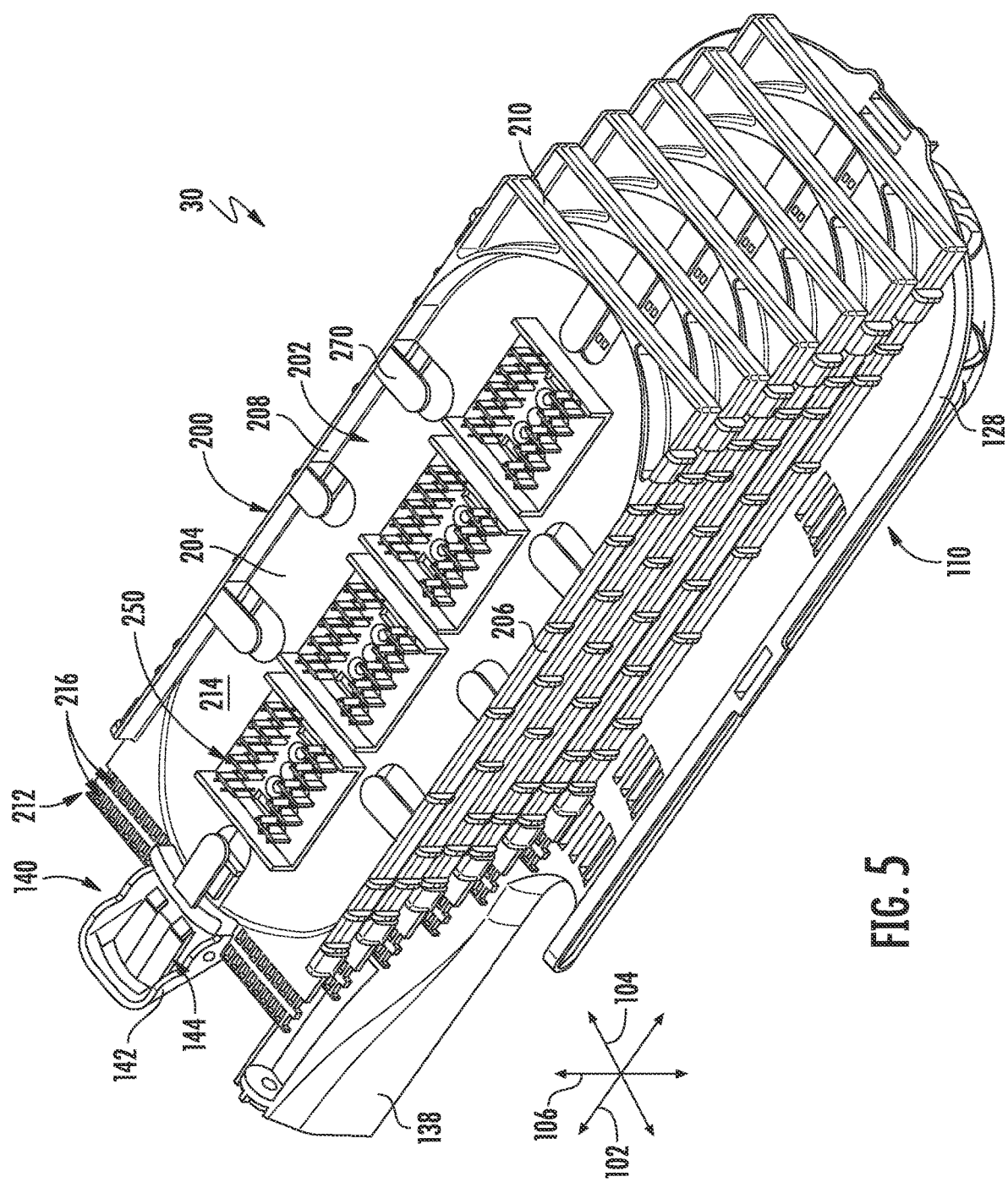
FIG. 5 is a perspective view of an organizer assembly, with a plurality of organizer trays connected thereon in first positions, in accordance with embodiments of the present disclosure.
Figure 6:
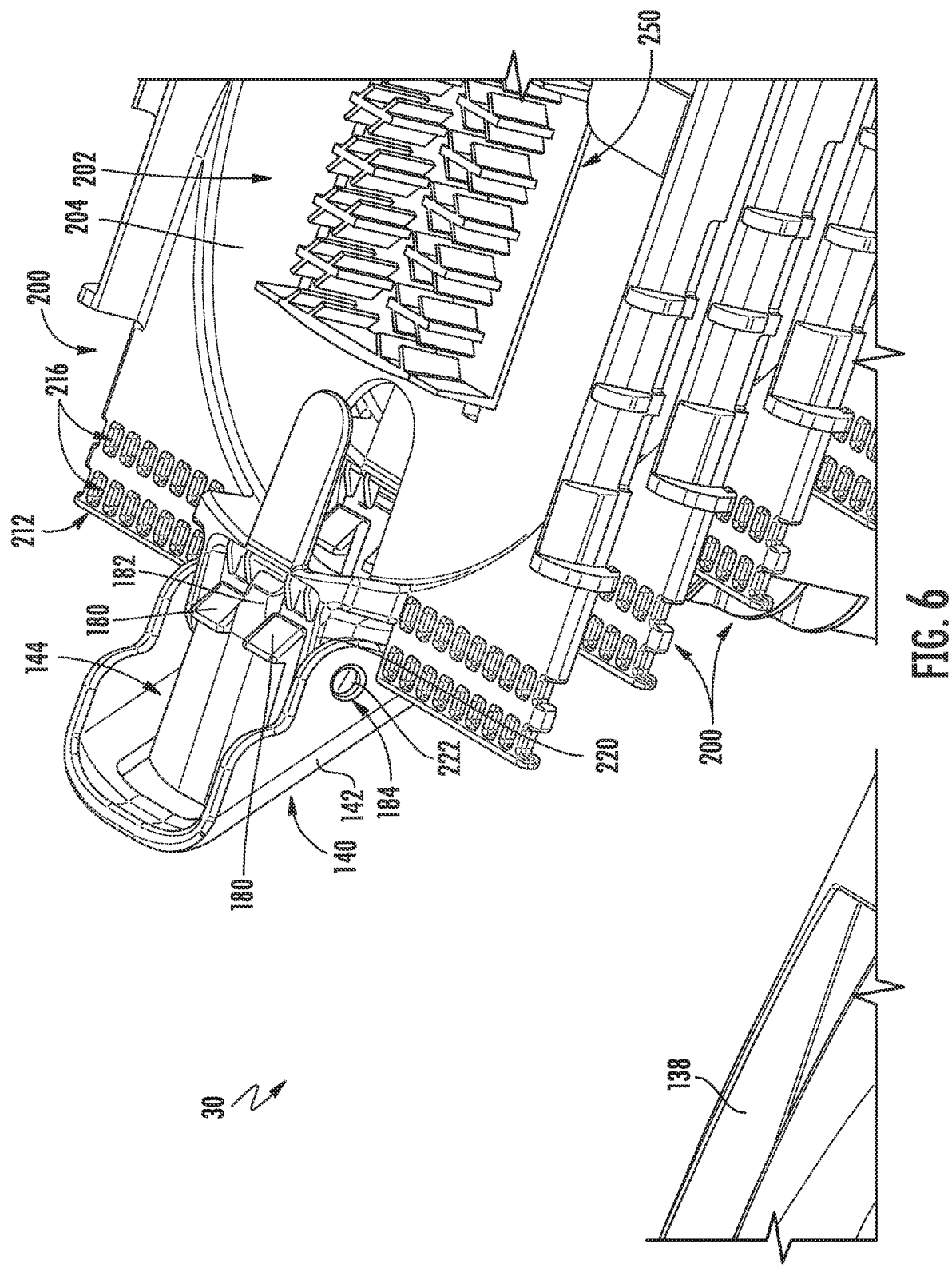
FIG. 6 is a perspective view of a portion of an organizer assembly, illustrating hinge assemblies and organizer trays with the organizer trays in first positions, in accordance with embodiments of the present disclosure.
Figure 7:
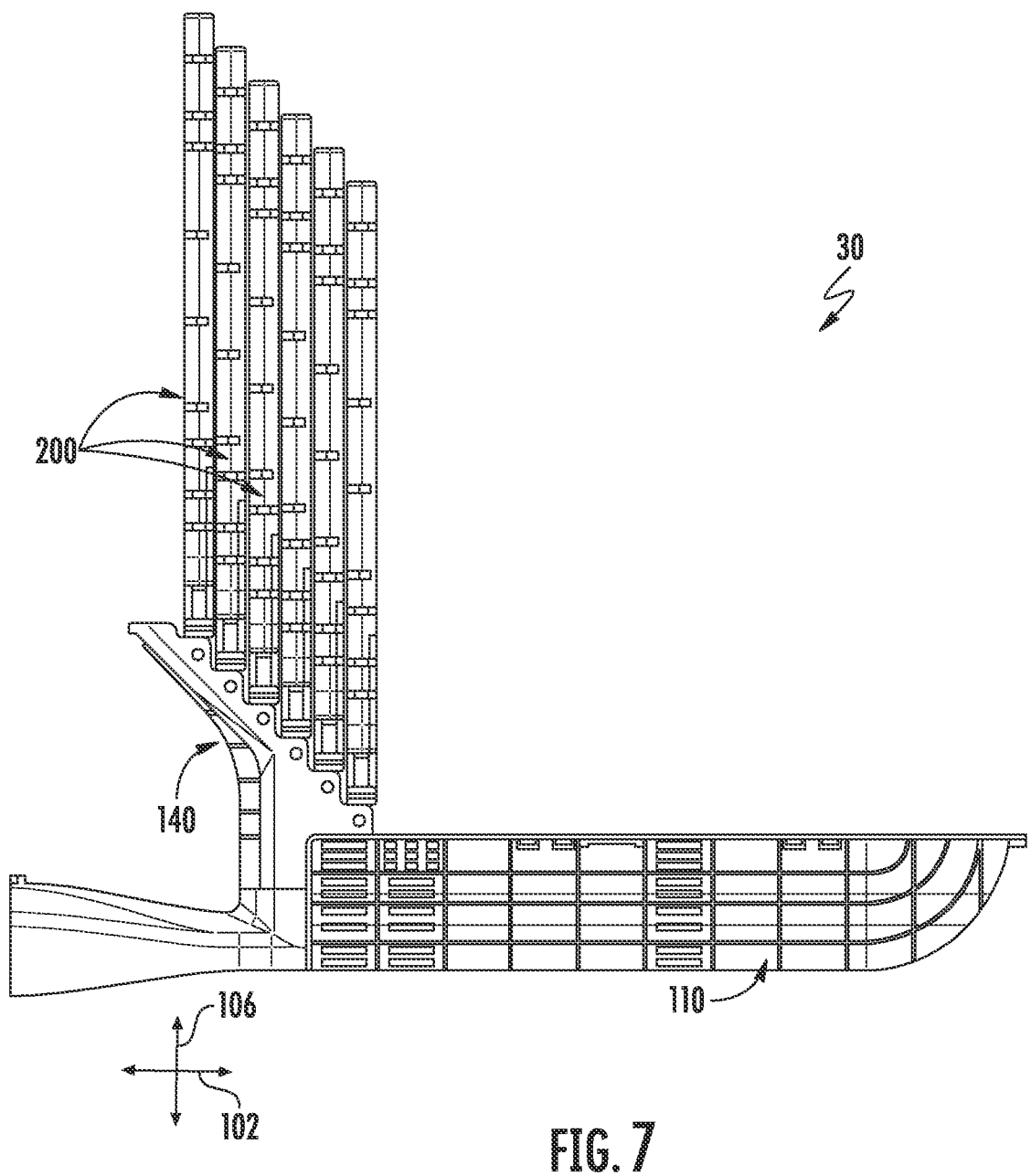
FIG. 7 is a side view of an organizer assembly, with a plurality of organizer trays connected thereon in second positions, in accordance with embodiments of the present disclosure.
Figure 8:
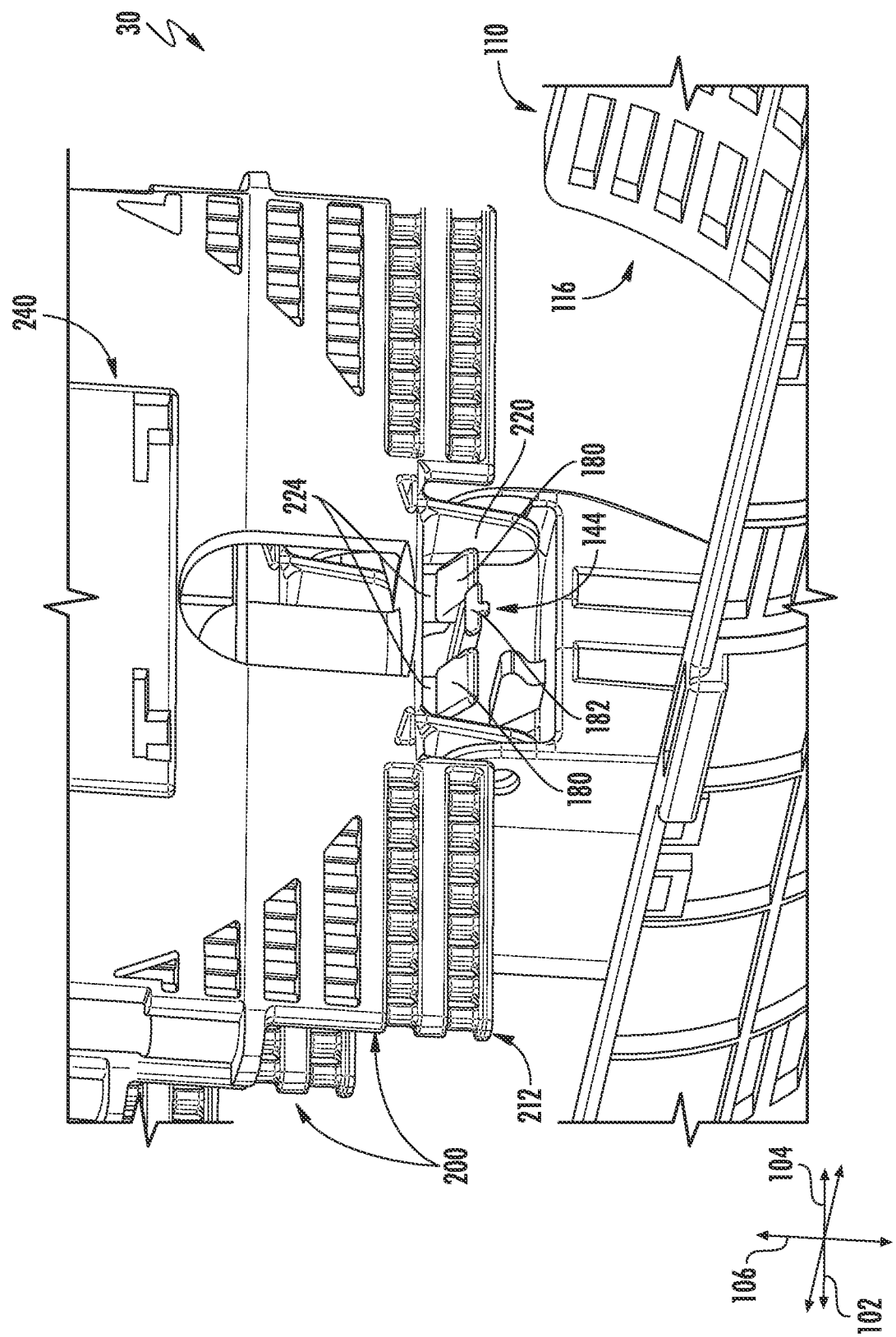
FIG. 8 is a perspective view of a portion of an organizer assembly, illustrating hinge assemblies and organizer trays with the organizer trays in second positions, in accordance with embodiments of the present disclosure.
Figure 9A:
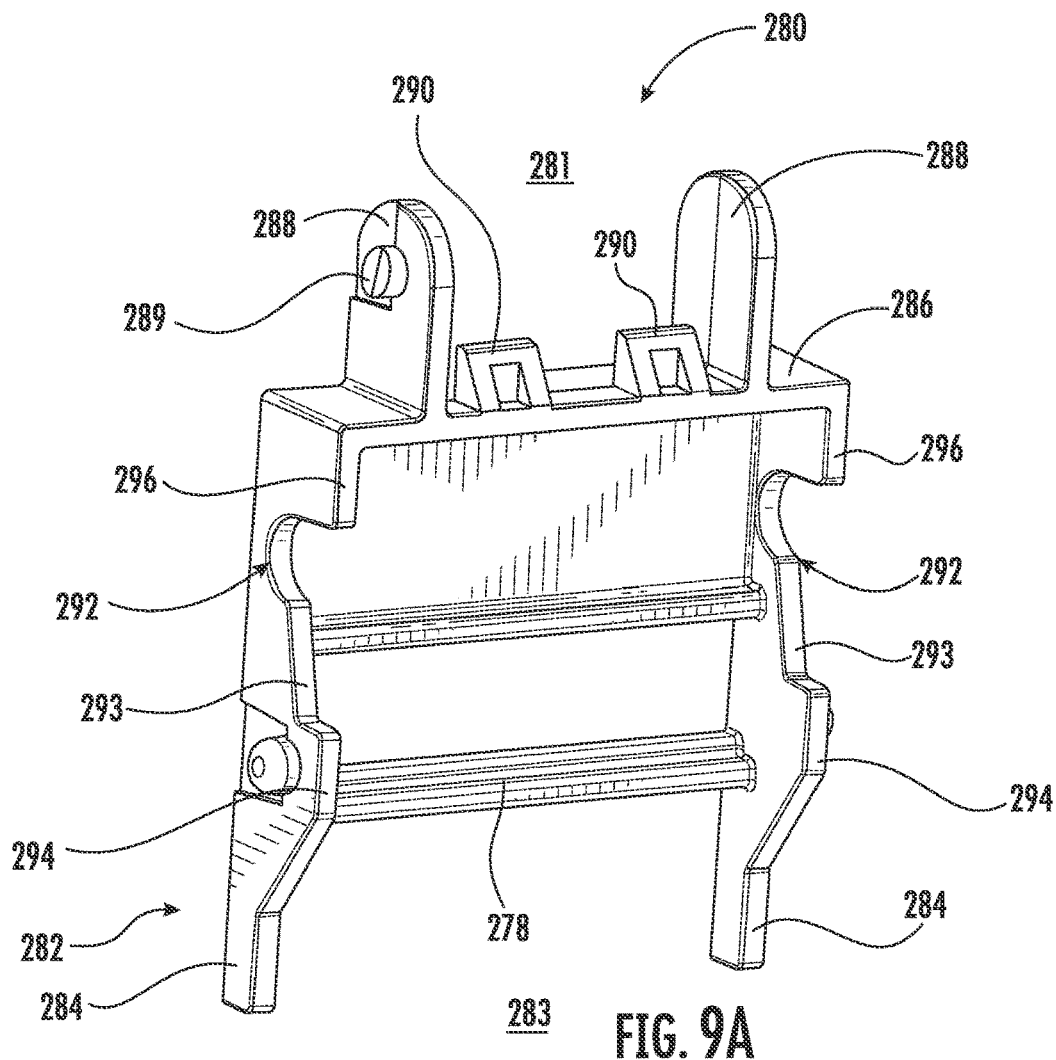
FIGS. 9A-9B provide perspective views of an adapter for a receptacle in accordance with embodiments of the present disclosure.
Figure 9B:
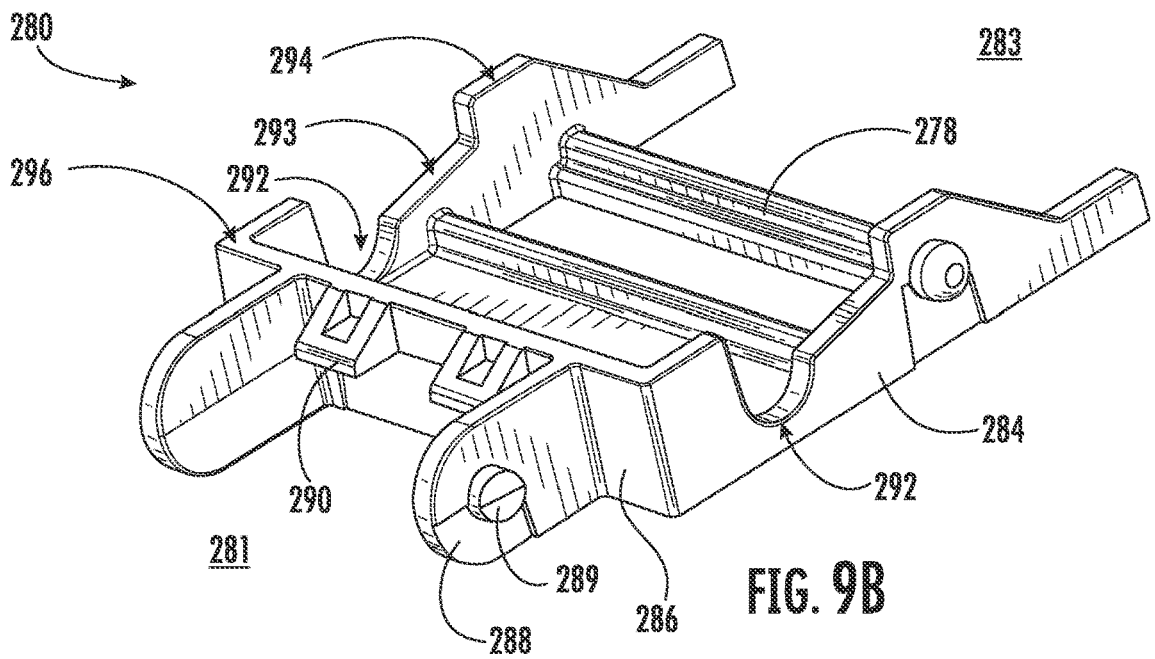
Figure 13:
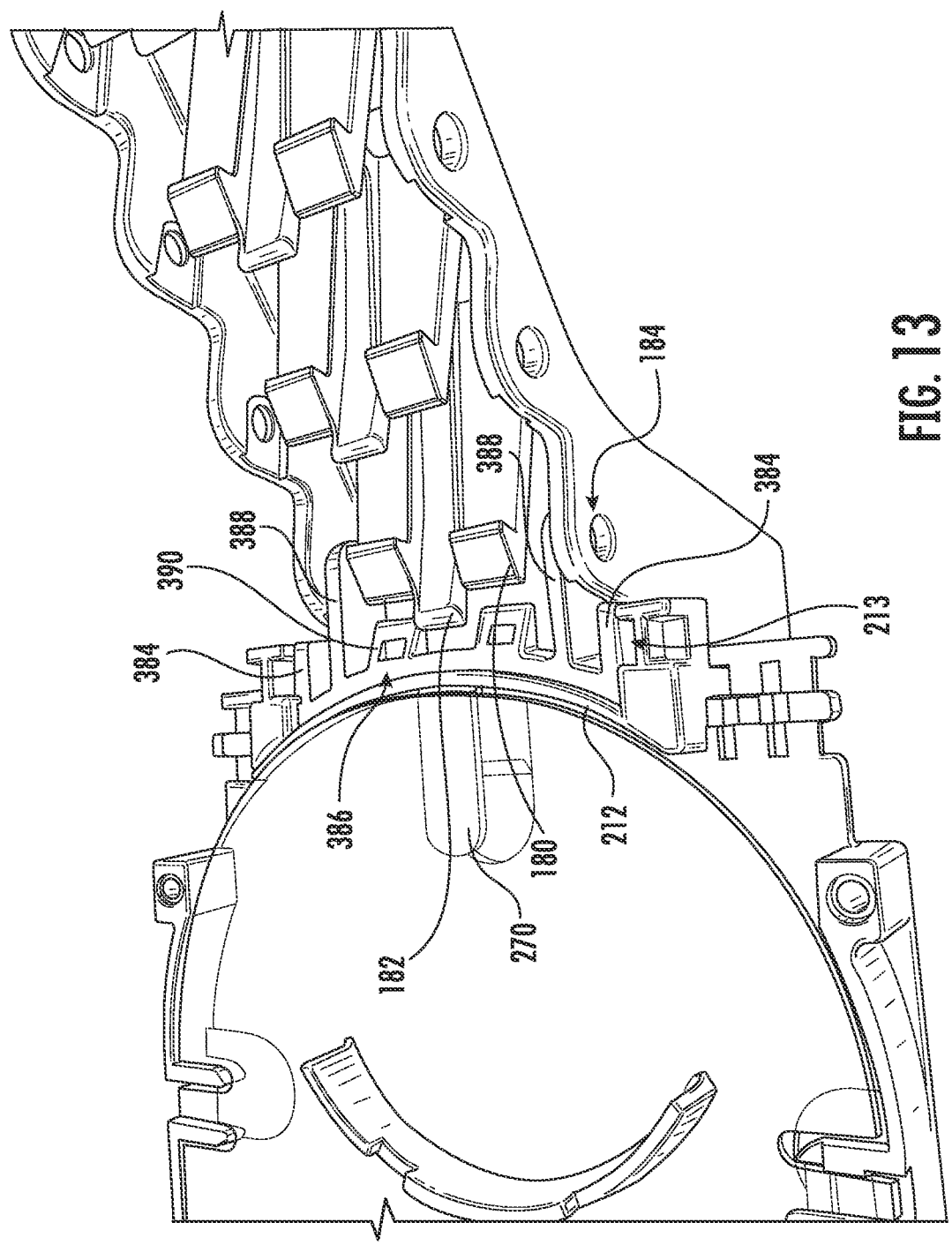
FIG. 13 is a perspective view of a portion of the closure in accordance with embodiments of the present disclosure.

Each organizer tray 200 is rotatably connectable, and thus may be rotatably connected, to the bracket assembly 140, such as to one of the plurality of hinge assemblies 144. Each organizer tray 200 may be rotatable, such as between a first position wherein the organizer tray 200 is aligned along the longitudinal axis 102 (as shown in FIGS. 5, 6, and 12) and a second position wherein the organizer tray 200 is aligned along the transverse axis 106 (as shown in FIGS. 7, 8, and 13).

For example, each organizer tray 200 may include a main body 202. Main body 202 may, for example, include a base wall 204, a first sidewall 206, a second sidewall 208, and a front wall 210, and may further define a rear end 212. First sidewall 206 and second sidewall 208 may be spaced apart along the lateral axis 104. Front wall 210 and rear end 212 may be spaced apart (such as along the longitudinal axis 102 when in the first position). The rear end 212 may be an open end, as shown, such that cables 42 or transmission elements thereof being directed along and parallel to the longitudinal axis 102 can enter or exit an interior 214 of the organizer tray 200 through the rear end 212, when the organizer tray 200 is in the first position. The front wall 210 and sidewalls 206, 208 may define a closed end and closed sides.

In some embodiments, a plurality of apertures 216 may be defined in the base wall 204, such as at the rear end 212. Each aperture 216 may be utilized to secure a cable 42 (or transmission element thereof) directly to the base wall 204 and organizer tray 200 thereof, such as using a suitable zip-tie or other suitable fastener. Notably, no additional cable/transmission element securement components are included on the organizer tray 200.

Organizer tray 200 may further include one or more connector arms 220 which may extend from the main body 202. For example, each connector arm 220 may extend from the base wall 204, such as along the transverse axis 106 when in the first position. The connector arms 220 may be removably connected to the hinge assembly 144, thus rotatably connecting the organizer tray 200 thereto. For example, protrusions 222 provided on the arms 220 may be inserted in depressions 184 to rotatably connect the organizer tray 200 to the hinge assembly 144.

As discussed, each of the plurality of organizer trays 200 may be rotatable between a first position and a second position. Further, each organizer tray 200 may advantageously be releasably securable in the second position, thus facilitating efficient loading of cables 42 and transmission elements thereof, splicing, etc., into other organizer trays 200 and the assembly 30 generally. The hinge assembly 144 which rotatable connects the organizer tray 200 to the bracket assembly 140 may releasably secure the organizer tray 200 in the second position.

For example, in exemplary embodiments as illustrated in FIG. 8, the one or more positioning tabs 180 of the associated hinge assembly 144 may contact and releasably secure the organizer tray 200 in the second position. In some embodiments, the organizer tray 200 may include one or more contact tabs 224, each of which extends from the rear end 212 of the body 202. When the organizer tray 200 is moved to the second position, each contact tab 224 may contact a positioning tab 180 and releasably secure the organizer tray 200 in the second position. For example, each contact tab 224 may ride up the tapered front surface of a positioning tab 180 and then rest in contact with a rear surface of the positioning tab 180 when the organizer tray 200 reaches the second position.

Further, in exemplary embodiments, the organizer tray 200 may be released from being secured in the second position to move from the second position to the first position. For example, movement of the release tab 182 may cause movement of the positioning tab(s) 180 out of contact with the organizer tray 200 (such as the contact tab(s) 224) thereof such that the organizer tray 200 can move from the second position to the first position. In exemplary embodiments, a user may apply force to the release tab 182 to cause such movement. For example, such force may pivot the release tab 182 and, due to a material connection between the release tab 182 and positioning tab(s) 180, also cause pivoting of the positioning tab(s) 180.

Figure 10:
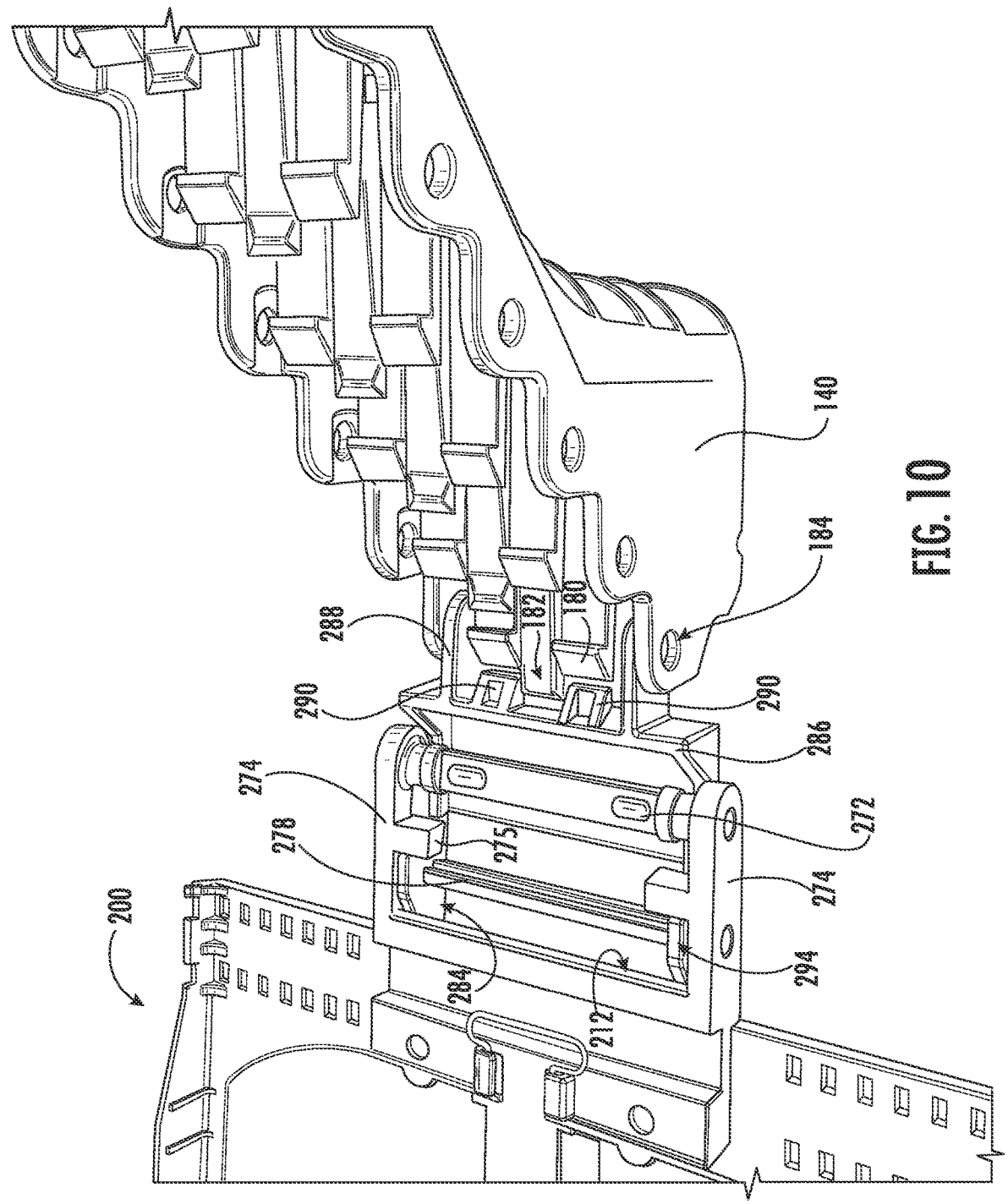
FIG. 10 is a perspective view of a portion of the closure in accordance with embodiments of the present disclosure.
Figure 12A:
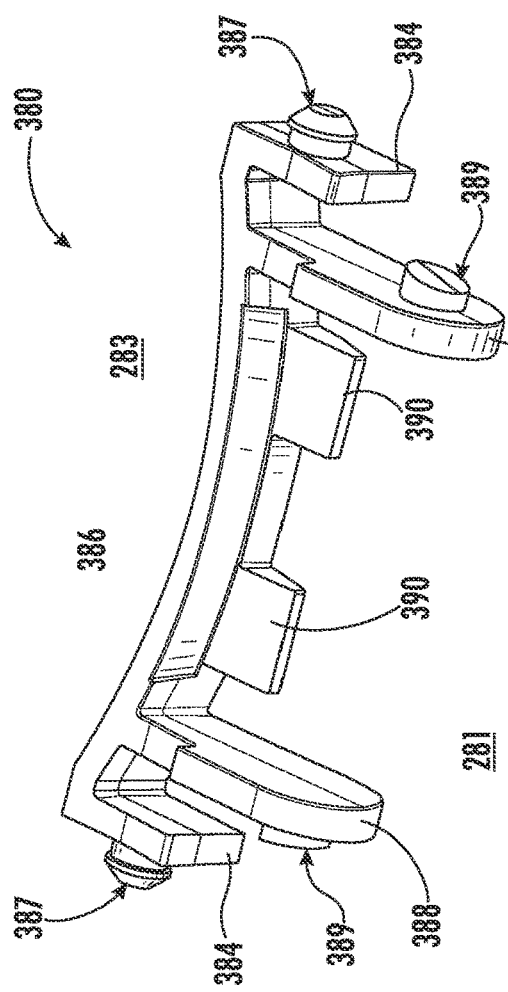
FIGS. 12A-12B provide perspective views of an adapter for a receptacle in accordance with embodiments of the present disclosure.
Figure 12B:
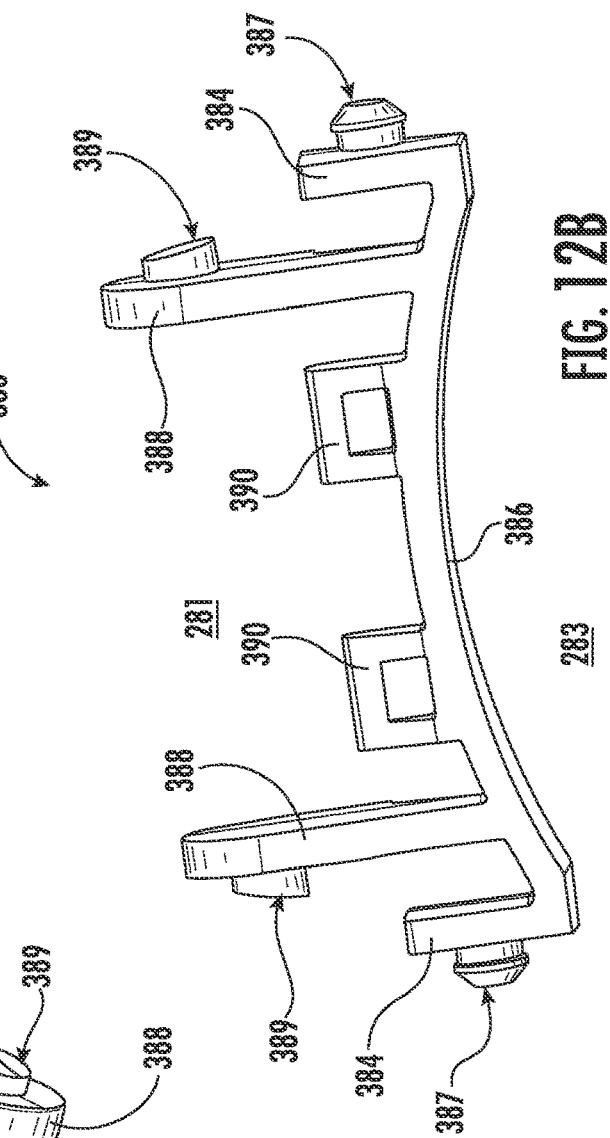
Figure 14:
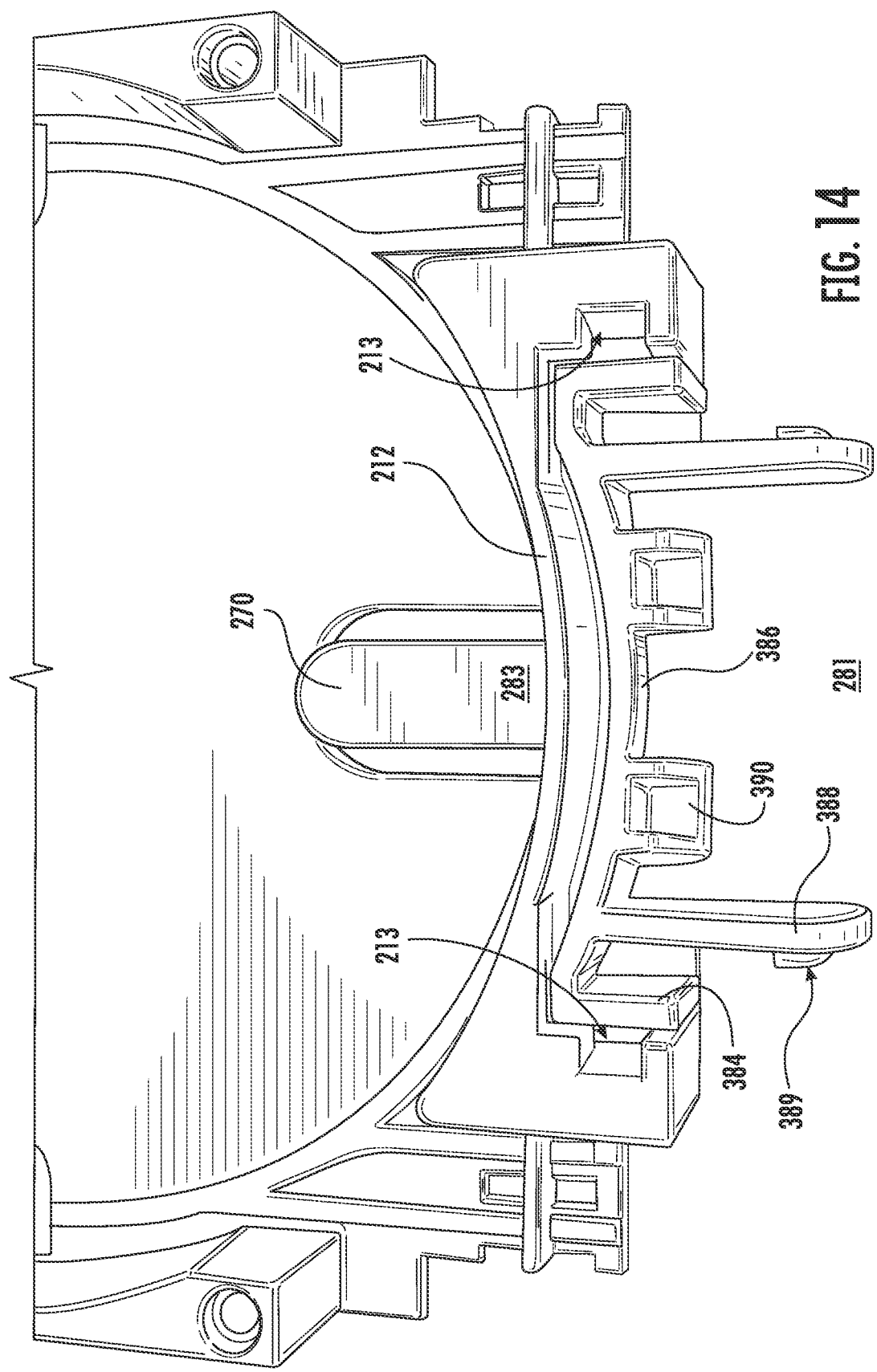
FIG. 14 is a top-down view of a portion of the closure disconnected from the bracket assembly, in accordance with embodiments of the present disclosure.

Referring now to FIGS. 9A-9B and FIGS. 12A-12B, embodiments of an adapter 280, 380 are provided. FIGS. 10-11 depict the adapter 280 extending between a rear end 212 of the tray 200 and the bracket assembly 140. FIGS. 13-14 depict adapter 380 extending between a rear end 212 of the basket 110 or tray 200 and the bracket assembly 140. Embodiments of the adapter provided herein allow a user to attach the adapter to the tray or basket to allow the respective tray or basket to fit directly into the closure 10. In particular embodiments, adapter allows direct connection of the tray or basket to the bracket assembly 140 without requiring mechanical fasteners (e.g., nuts, bolts, screws, etc.), adhesives, wraps, straps, restraints, or other fastening devices. Embodiments of adapter 280, 380 provided herein allow for mounting trays, such as tray 200 provided herein, or baskets, such as basket 110, or receptacles generally. As such, receptacles not originally designed or intended for use with embodiments of the closure 10 provided herein may be mounted to the bracket assembly 140 via the adapter 280, 380.

Adapter 280 includes a body 282 having a pair of arms 284 extending along the longitudinal axis 102 and separated from one another along the lateral axis 104. The pair of arms 284 extend along the longitudinal axis 102 from a lateral wall 286 extending along the lateral axis 104. The lateral wall 286 connects the pair of arms 284, such as positioning the pair of arms 284 in parallel arrangement along the longitudinal axis 102. The lateral wall 286 may particularly be positioned at a forward end 281. The forward end 281 is distal along the longitudinal axis 102 to a rearward end 283. The forward end 281 is the end at which the adapter 280 attaches to bracket assembly 140. The rearward end 283 is the end at which the adapter 280 attaches to the receptacle, such as the tray 200 or the basket 110. A pair of pivot arms 288 extend along the longitudinal axis 102 from the lateral wall 286. Each pivot arm 288 includes a protrusion 289 configured to insert within depression 184 at the bracket assembly 140, such as described regarding depression 222.

The adapter 280 is contoured such that when the adapter 280 is connected to the bracket assembly 140 and the tray 200, the load of the bracket assembly 140 reacts against a standoff 290 protruding along the longitudinal direction 102 from the lateral wall 286 toward the bracket assembly 140. The standoff 290 extends along the longitudinal axis 102 less than the extension of the pivot arm 288 along the longitudinal axis 102. In particular embodiments, the standoff 290 extends along the longitudinal axis 102 less than the position of the protrusion 289 at the pivot arm 288.

The pair of arms 284 each include a notch 292 extending inward into the arm 284 along the transverse axis 106. The notch 292 is configured to receive a cross member 272 of the tray 200. In particular embodiments, the notch 292 forms a semi-circular groove contoured into the arm 284. The cross member 272 extends along the lateral axis 104 between a pair of arms 274 extending along the longitudinal axis 102 from the tray 200. The pair of arms 274 at the tray 200 may particularly extend from the base wall 204. The pair of arms 284 at the adapter 280 are separated along the lateral axis 104 less than the separation of the pair of arms 274 at the tray 200 along the lateral axis 104. The notch 292 is configured to receive the cross member 272 extending between the pair of arms 274 and the arms 274 may extend alongside, or in contact with, the pair of arms 284.

Each arm 284 is contoured from the notch 292 to a tab 294 extending along the transverse axis 106. In certain embodiments, the tab 294 includes a face extending along the longitudinal axis 102 that is raised co-planar to an upper face 296 at the lateral wall 286. By contrast, the notch 292 is lower along the transverse axis 106 relative to the upper face 296 and tab 294.

The adapter 280 may include a cross member 278 extending between the pair of arms 284. The cross member 278 may be positioned between the upper faces 296 at the respective arms 284. A step 293 is formed along the longitudinal axis 102 between the tab 294 and the notch 292. The step 293 is inward along the transverse axis 106 between the notch 292 and the tab 294. Tray 200 includes a step 275 extending along the lateral axis 104 from each pivot arm 274. The step 275 extends inward toward the respective pair of pivot arms 274. The step 275 is positioned along the longitudinal axis 102 between the cross member 272 and the base wall 204 of the tray 200. When the adapter 280 is positioned at the tray 200, the step 275 is positioned between the tab 294 at the adapter 280 and the cross member 272 at the tray 200. The tab 294 at the adapter 280 is positioned between the base wall 204 and the step 275. Accordingly, the step 275 may particularly be positioned at the step 293 at the adapter 280. When the load of the bracket assembly 140 reacts against the standoff 290, the step 293 at the adapter 280 may furthermore be pushed against the step 275 at the tray 200. The reactive forces may retain the adapter 280 in position at the tray 200 while supporting the bracket assembly 140.

Referring to FIGS. 12A-12B and FIGS. 13-14, adapter 380 includes a lateral wall 386 having a pair of pivot arms 388 extending along the longitudinal axis 102, such as described regarding adapter 280. Pivot arms 388 include protrusion 389, such as described regarding protrusion 289. Adapter 380 includes a pair of arms 384 extending along the longitudinal axis 102 from the lateral wall 386. The pair of arms 384 extend along the longitudinal axis 102 toward the forward end 281. Arms 384 include protrusion 387 configured to wedge or lodge within a slot 213 at the rear end 212 of tray 200. Standoffs 390 extend along the longitudinal axis 102 toward the forward end 281, such as depicted and described regarding standoffs 290. In various embodiments, lateral wall 386 is contoured to correspond to the rear end 212 of the basket 110 or tray 200. In certain embodiments, lateral wall 386 is curved. In other embodiments, lateral wall 386 may be straight or non-curved.

The adapter 280, 380 may operate similarly as the tabs and contacts described between the tray 200 and the bracket assembly 140, such as in regard to FIG. 8. The one or more positioning tabs 180 of the associated hinge assembly 144 may contact the standoff 290, 390 at the adapter 280, 380 and releasably secure the organizer tray 200 in the second position. When the organizer tray 200 is moved to the second position, each standoff 290, 390 may contact a positioning tab 180 and releasably secure the organizer tray 200 in the second position. For example, each standoff 290, 390 may ride up the tapered front surface of a positioning tab 180 and then rest in contact with a rear surface of the positioning tab 180 when the organizer tray 200 reaches the second position.

Further, in exemplary embodiments, the organizer tray 200 may be released from being secured in the second position to move from the second position to the first position. For example, movement of the release tab 182 may cause movement of the positioning tab(s) 180 out of contact with the adapter 280, 380 attached to the rear end 212 of the organizer tray 200 such that the organizer tray 200 can move from the second position to the first position. In exemplary embodiments, a user may apply force to the release tab 182 to cause such movement. For example, such force may pivot the release tab 182 and, due to a material connection between the release tab 182 and positioning tab(s) 180, also cause pivoting of the positioning tab(s) 180.

Figure 15:
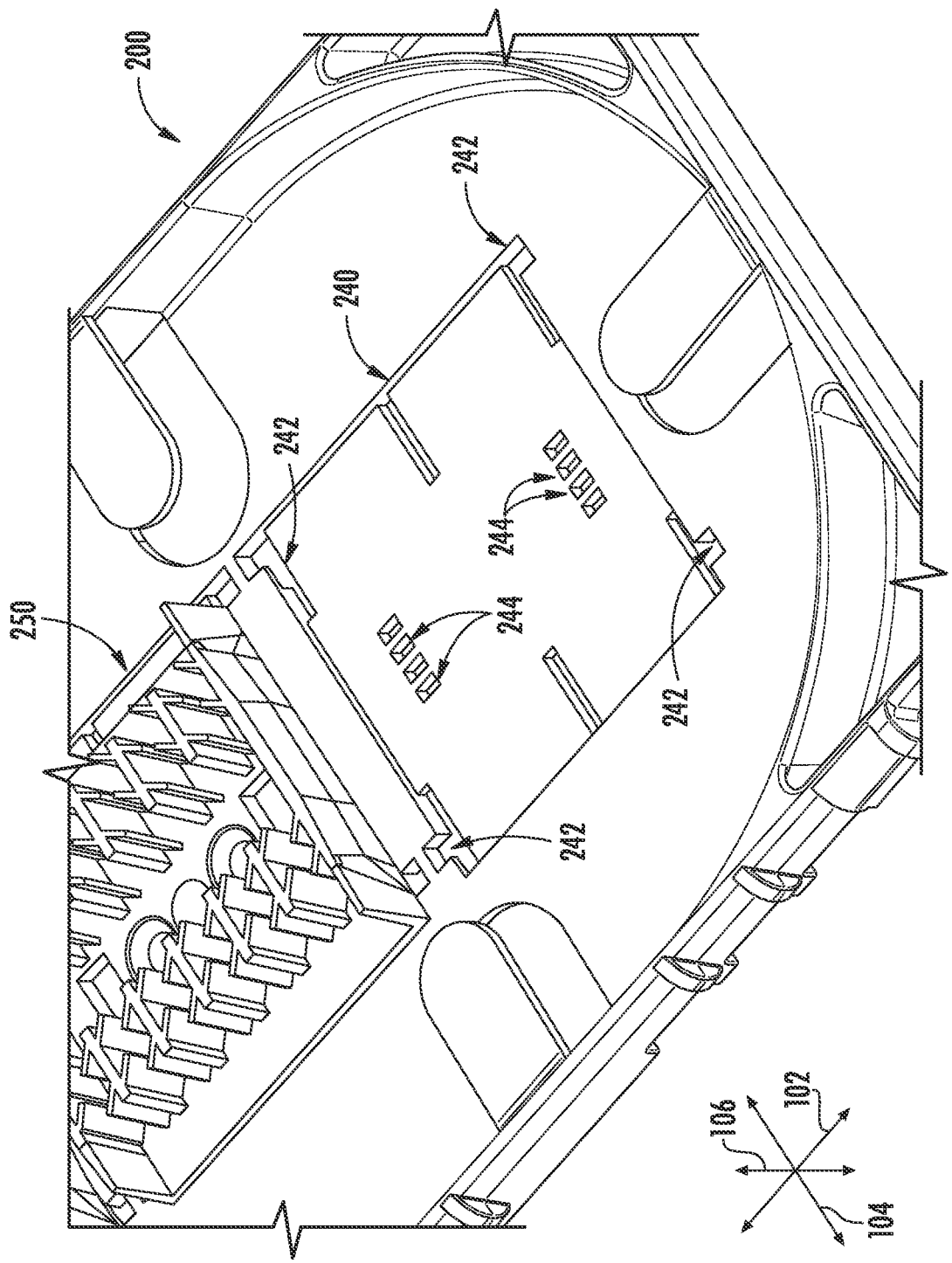
FIG. 15 is a perspective view illustrating a module mounting location in accordance with embodiments of the present disclosure.
Figure 16:
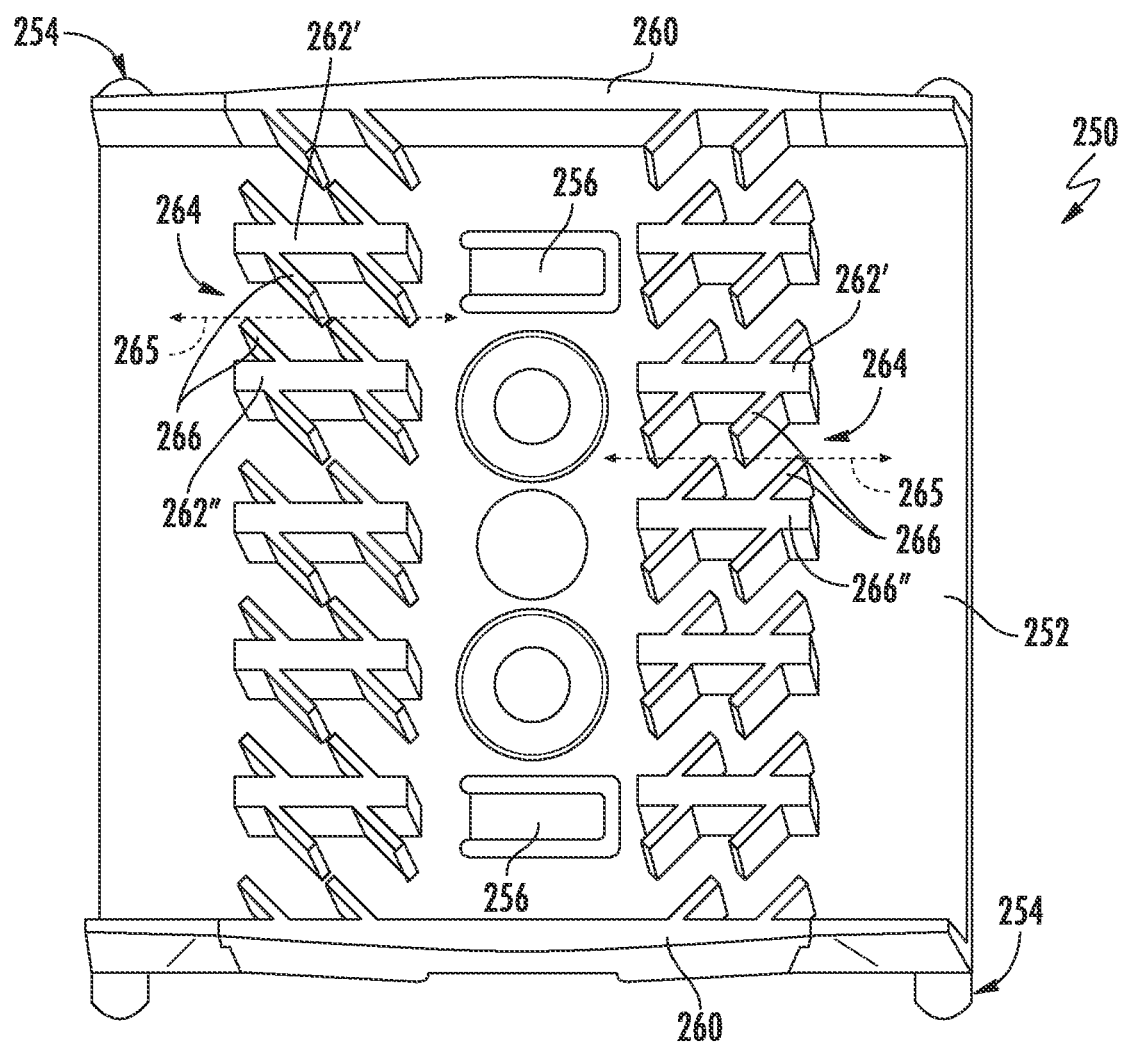
FIG. 16 is a perspective view of a splice module in accordance with embodiments of the present disclosure.
Figure 17:
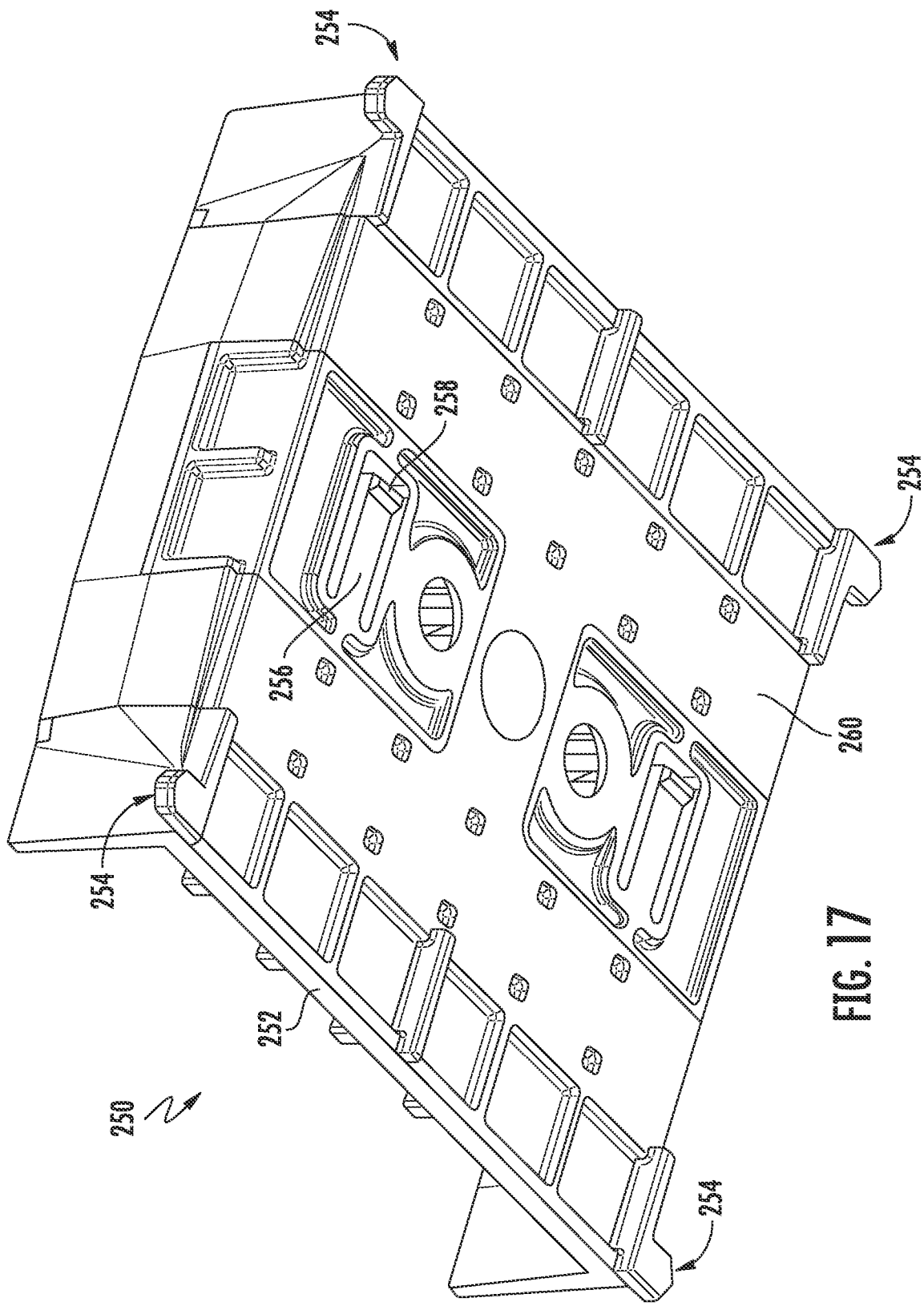
FIG. 17 is a bottom perspective view of a splice module in accordance with embodiments of the present disclosure.

Referring now in particular to FIGS. 15 through 17, each organizer tray 200 may advantageously include features for ensuring and securing proper positioning of the organizer trays 200 relative to each other in the first and second positions. For example, each organizer tray 200 may include one or more pluralities of positioning slots 230 and one or more positioning tabs 232. The slots 230 may, for example, be defined in exterior surfaces of the first sidewall 206 and/or second sidewall 208, such as adjacent or at the base wall 204. The positioning tab(s) 232 may extend from the first sidewall 206 and/or second sidewall 208, such as at a top of the organizer tray 200 opposite the base wall 204.

Figure 18:
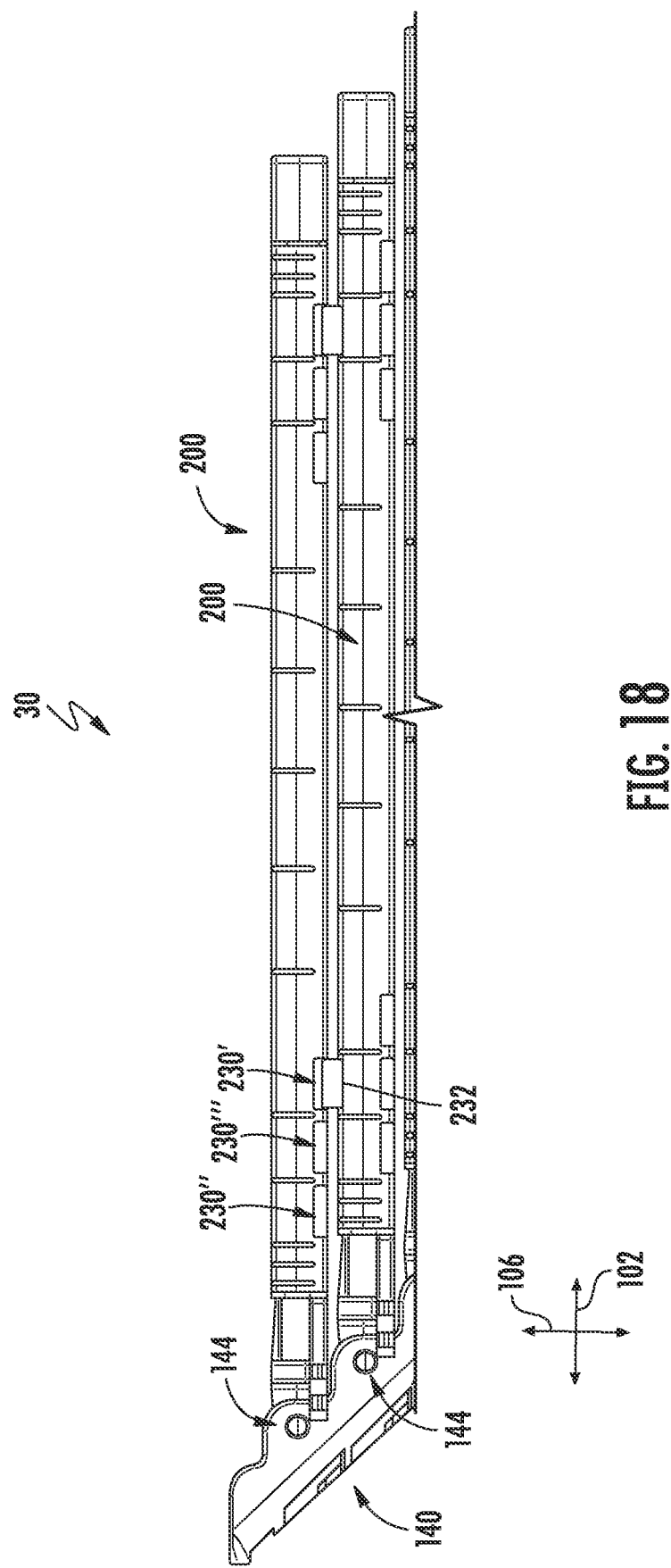
FIG. 18 is a side view of organizer trays in first positions in accordance with embodiments of the present disclosure.
Figure 19:
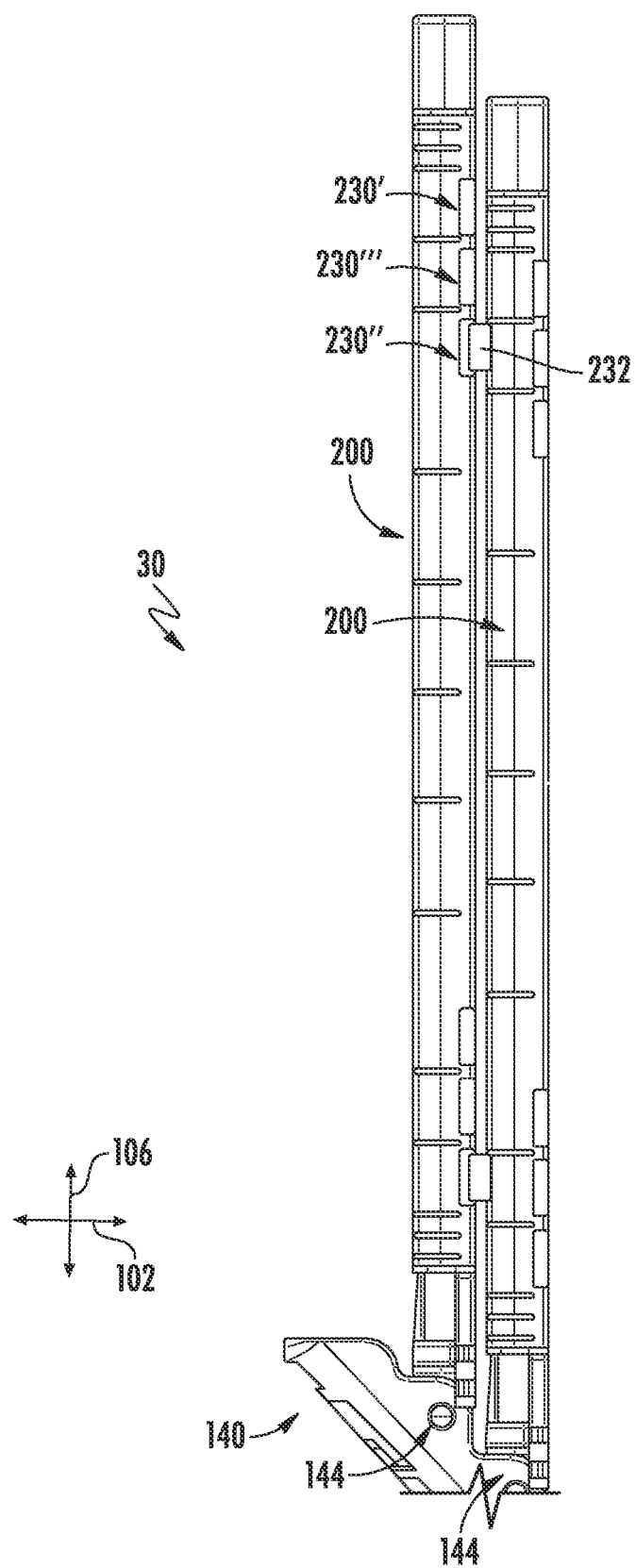
FIG. 19 is a side view of organizer trays in second positions in accordance with embodiments of the present disclosure.

Advantageously, a positioning tab 232 of an organizer tray 200' may be inserted into a different positioning slot 230 of a plurality of positioning slots 230 in a neighboring organizer tray 200" depending on the positions of the organizer trays 200. For example, a positioning tab 232 of an organizer tray 200' may be inserted in one of the plurality of positioning slots 230' of a neighboring organizer tray 200" when these trays 200', 200" (such as, for example, the plurality of organizer trays 200) is in the first position (see FIG. 18). The positioning tab 232 of the organizer tray 200' may be inserted in another one of the plurality of positioning slots 230" of the neighboring organizer tray 200" when these trays 200', 200" (such as, for example, the plurality of organizer trays 200) is in the second position (see FIG. 19).

Figure 20:
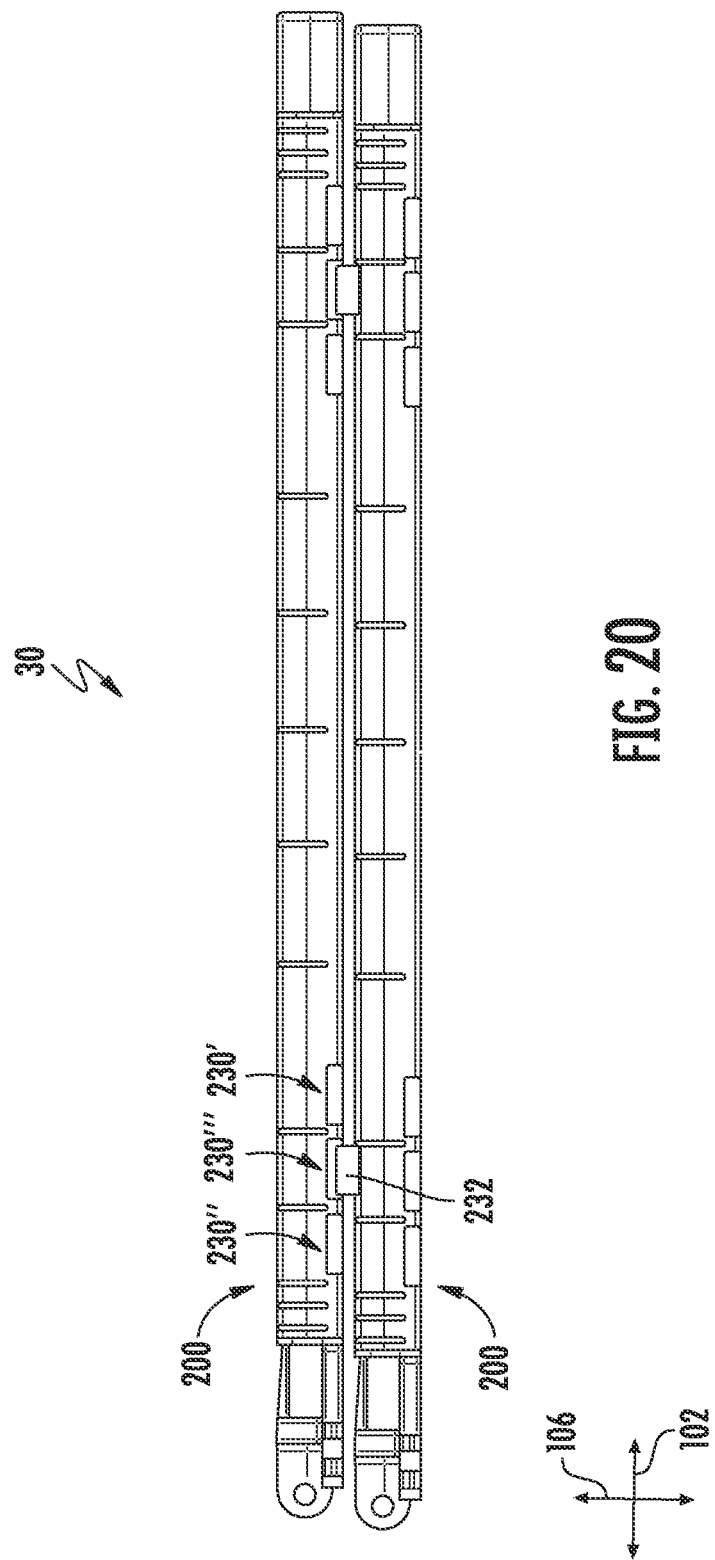
FIG. 20 is a side view of organizer trays removed and stacked in accordance with embodiments of the present disclosure.

As discussed, in some embodiments the organizer trays 200 may be removable from the bracket assembly 140 and organizer assembly 30 generally. In some embodiments, the positioning tab 232 of the organizer tray 200' may further be inserted in yet another one of the plurality of positioning slots 230''' of the neighboring organizer tray 200" when these trays 200', 200" (such as, for example, the plurality of organizer trays 200) are removed from the bracket assembly 140 and stacked together, such as in a vertical array (see FIG. 20). Accordingly, organization and retention of the organizer trays 200 is advantageously facilitated even when the organizer trays 200 are not connected to the bracket assembly 140 and organizer assembly 30 generally.

Referring now in particular to FIGS. 15 through 17, each organizer tray 200 may generally accommodate one or more splice modules 250. Each splice module 250 may be removable connected to the organizer tray 200, such as to the base wall 204 thereof. For example, base wall 204 may include a plurality of module mounting locations 240. In exemplary embodiments, each of the module mounting locations 240 may include a plurality of leg slots 242 which may be defined through the base wall 204 and one or more pluralities of positioning slots 244 which may be defined through the base wall 204. The leg slots 242 may, for example, define at least a portion of a periphery of the module mounting location 240, and may for example, be disposed at corners of the module mounting location 240. Each plurality of positioning slots 244 may be defined within the periphery of the module mounting location 240, and may for example extend in a linear array. The leg slots 242 and positioning slots 244 may generally facilitate removable connection of a splice module 250 to the organizer tray at a module mounting location 240.

Each splice module 250 may, for example, include a base 252 and a plurality of legs 254 extending from the base 252, such as below the base 252 as shown. The legs 254 may further extend from and at least partially define a periphery of the base 252, and may further be disposed at corners of the base 252. To removably connect a splice module 250 to an organizer tray 200 at a module mounting location 240, each leg 254 may be inserted into one of the leg slots 242 of a module mounting location 240. Further, a splice module 250 may include one or more cantilevered arms 256 extending from the base 252, such as below the base 252 as shown. Each cantilevered arm 256 may include a tab 258 at a distal end thereof. To removably connect a splice module 250 to an organizer tray 200 at a module mounting location 240, the cantilevered arm 256, such as the tab 258 thereof, may be inserted in one of a plurality of positioning slots 244 of a module mounting location 240.

In exemplary embodiments, a splice module 250 may be removably connectable to an organizer tray 200, such as at a module mounting location 240, in multiple different orientations. For example, the plurality of positioning slots 244 may be oriented such that the cantilevered arm 256, such as the tab 258 thereof, may be inserted in a different one of a plurality of positioning slots 244 depending on the orientation of the splice module 250.

Splice modules 250 in accordance with the present disclosure may advantageously be dual material components. For example, splice modules 250 may further include one or more module walls or overmolded portions 260 which are disposed on portions of the base 252, such as on a lower surface and sidewalls thereof. The overmolded portions 260 advantageously provide improved structural integrity, rigidity, and protection. The base 252, as well as the legs 254 and cantilevered arms 256 thereof, may for example, be formed from a hard plastic such as polycarbonate or nylon. The overmolded portions 260 may be formed from suitable elastomers, such as vulcanized elastomers.

Splice modules 250 in accordance with the present disclosure may further include a plurality of partitions 262, each of which may extend from the base 252. The partitions 262 may be generally parallel to each other, and neighboring partitions 262 may define channels 264 therebetween. Partitions 262 extending from the module wall or portion 260 extend along a direction between the lateral axis and the longitudinal axis, such as an oblique direction. The partition 262 may be deformable to allow a splice sleeve to affix to the splice module between pairs of module walls or overmolded portions 260. Each channel 264 may define and extend along a longitudinal channel axis 265, as shown. Further, one or more arms 266 may extend from one or more of the neighboring partitions 262 into one or more of the channels 264 defined by such neighboring partitions 262. Such arms 266 may extend into the channels 264 at an angle to the longitudinal channel axis 265, as shown. For example, a first partition 262' of neighboring partitions 262 may include one or more arms 266 extending into a channel 264 defined by the neighboring partitions 262, and a second partition 262" of neighboring partitions 262 may include one or more arms 266 extending into the channel 264 defined by the neighboring partitions 262. Further, in exemplary embodiments as shown, the one or more arms 266 extending into a channel 264 from a first partition 262' may extend in a direction opposite the direction of the one or more arms 266 extending into the channel 264 from a second partition 262".

In exemplary embodiments, partitions 262 and arms 266 of splice modules 250 may be formed from suitable elastomers, such as vulcanized elastomers.

Splice modules 250 in accordance with the present disclosure, and in particular the configuration of the partitions 262 and arms 266, are particularly advantageous due to their versatility and flexibility in accommodating various components. For example, a channel 264 of a splice module 250 may be capable of holding triple-stacked single spliced transmission elements, double-stacked ribbon spliced transmission elements, mechanical splices, splitter modules from 1:2 to 1:32, PLCs, etc.

Organizer trays 200 may further include one or more retainer tabs 270, each of which may extend from a wall, such wall 206, 208, or 210, into the interior 214. Such retainer tabs 270 may generally assist in routing and retaining cables 42 and transmission elements in the interior 214 during assembly, splicing, etc., thereof.

Further aspects of the invention are provided by one or more of the following embodiments:

1. A fiber optic closure, the closure including a receptacle including a plurality of sidewalls extending along a longitudinal axis between a first end and a second end, wherein the first end forms an open end such that a cable is extendable to or from an interior of the receptacle; a base wall extending from the plurality of sidewalls along the longitudinal axis and a lateral axis, wherein the base wall forms a plurality of apertures at the first end; an end wall extending along the lateral axis between the plurality of sidewalls, wherein the receptacle forms the interior between the plurality of sidewalls, the base wall, and the end wall; a bracket assembly extending along a transverse axis, the bracket assembly including a main body and a plurality of hinge assemblies, wherein the plurality of hinge assemblies is spaced apart in a linear array along the transverse axis; and an adapter connectable to the receptacle and the bracket assembly, the adapter including a pair of pivot arms connectable to the bracket assembly, the pair of pivot arms extending along the longitudinal axis from a lateral wall extending along the lateral axis, the lateral wall attachable to the receptacle via a pair of arms extending along the longitudinal axis from the lateral wall.

2. The closure of any one or more clauses herein, wherein the adapter includes a standoff extending along the longitudinal axis from the lateral wall toward the bracket assembly.

3. The closure of any one or more clauses herein, wherein each hinge assembly includes a positioning tab and a release tab.

4. The closure of any one or more clauses herein, wherein the release tab is extended along the longitudinal axis from the main body farther than the positioning tab.

5. The closure of any one or more clauses herein, wherein the positioning tab of the hinge assembly is contactable to the standoff at the adapter.

6. The closure of any one or more clauses herein, wherein the standoff at the adapter contacts the positioning tab of the hinge assembly when the receptacle is rotated from a first position to a second position.

7. The closure of any one or more clauses herein, wherein the standoff at the adapter moves along a tapered front surface of the positioning tab when rotating the receptacle from the first position to the second position.

8. The closure of any one or more clauses herein, wherein standoff at the adapter rests in contact with a rear surface of the positioning tab when the receptacle is in the second position.

9. The closure of any one or more clauses herein, wherein the pair of pivot arms includes a protrusion, and wherein each hinge assembly includes a depression at which the protrusion is receivable.

10. The closure of any one or more clauses herein, wherein the receptacle is rotatable between a first position and a second position, wherein the receptacle is aligned along the longitudinal axis in the first position, and wherein the receptacle is aligned along the transverse axis or an angle between the longitudinal axis and the transverse axis in the second position.

11. The closure of any one or more clauses herein, wherein the standoff extends along the longitudinal axis less than a position of a protrusion at the pivot arm.

12. The closure of any one or more clauses herein, wherein the pair of arms forms a notch extending inward into the arm along the transverse axis.

13. The closure of any one or more clauses herein, wherein a pair of arms extends along the longitudinal axis from a rear end of the receptacle, the pair of arms of the receptacle positioned outward of the pair of arms of the adapter along the lateral axis.

14. The closure of any one or more clauses herein, a cross member extends along the lateral axis between the pair of arms of the receptacle, and wherein the notch at the adapter is configured to receive the cross member of the receptacle.

15. The closure of any one or more clauses herein, wherein each arm of the adapter is contoured from the notch to a tab extending along the transverse axis, and wherein the tab includes a face extending along the longitudinal axis co-planar to an upper face at the lateral wall.

16. The closure of any one or more clauses herein, wherein a step is formed along the longitudinal axis between the tab and the notch, wherein the step is inward along the transverse axis between the notch and the tab.

17. The closure of any one or more clauses herein, wherein the receptacle includes a step extending along the lateral axis between each pivot arm, wherein the step extends inward toward the respective pair of pivot arms, and wherein the step is positioned along the longitudinal axis between the cross member and the base wall at the receptacle.

18. The closure of any one or more clauses herein, wherein the step at the receptacle is positioned between the tab at the adapter and the cross member at the receptacle, and wherein the tab is positioned between the base wall and the step at the receptacle.

19. A fiber optic closure, the closure including an organizing tray including a plurality of sidewalls extending along a longitudinal axis between a first end and a second end, wherein the first end forms an open end such that a cable is extendable to or from an interior of the organizing tray, the organizing tray including a base wall extending from the plurality of sidewalls along the longitudinal axis and a lateral axis, wherein the base wall forms a plurality of apertures at the first end, the organizing tray including an end wall extending along the lateral axis between the plurality of sidewalls, wherein the organizing tray forms the interior between the plurality of sidewalls, the base wall, and the end wall, wherein the organizer tray is rotatable between a first position and a second position, wherein the organizing tray is aligned along the longitudinal axis in the first position, and wherein the organizing tray is aligned along the transverse axis or an angle between the longitudinal axis and the transverse axis in the second position, the organizing tray including a pair of arms extending along the longitudinal axis from a rear end of the organizing tray; a bracket assembly extending along a transverse axis, the bracket assembly including a main body and a plurality of hinge assemblies, wherein the plurality of hinge assemblies is spaced apart in a linear array along the transverse axis, wherein each hinge assembly includes a depression; and an adapter connectable to the organizing try and the bracket assembly, the adapter including a pair of pivot arms connectable to the bracket assembly, the pair of pivot arms extending along the longitudinal axis from a lateral wall extending along the lateral axis, the lateral wall attachable to the organizer tray via a pair of arms extending along the longitudinal axis from the lateral wall, wherein the pair of pivot arms includes a protrusion receivable at the depression at the hinge assembly, the pair of arms of the organizing tray positioned outward along the lateral axis of the pair of arms of the adapter.

20. The closure of any one or more clauses herein, wherein the adapter includes a standoff extending along the longitudinal axis from the lateral wall toward the bracket assembly, each hinge assembly includes a positioning tab and a release tab, the release tab is extended along the longitudinal axis from the main body farther than the positioning tab, the standoff at the adapter contacts the positioning tab of the hinge assembly when the organizer tray is rotated from the first position to the second position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic closure, the closure comprising:
   a receptacle comprising;
      a plurality of sidewalls extending along a longitudinal axis between a first end and a second end, wherein the first end forms an open end such that a cable is extendable to or from an interior of the receptacle;
      a base wall extending from the plurality of sidewalls along the longitudinal axis and a lateral axis, wherein the base wall forms a plurality of apertures at the first end;
      an end wall extending along the lateral axis between the plurality of sidewalls, wherein the receptacle forms the interior between the plurality of sidewalls, the base wall, and the end wall;
   a bracket assembly extending along a transverse axis, the bracket assembly comprising a main body and a plurality of hinge assemblies, wherein the plurality of hinge assemblies is spaced apart in a linear array along the transverse axis; and
   an adapter connectable to the receptacle and the bracket assembly, the adapter comprising a pair of pivot arms connectable to the bracket assembly, the pair of pivot arms extending along the longitudinal axis from a lateral wall extending along the lateral axis, the lateral wall attachable to the receptacle via a pair of arms extending along the longitudinal axis from the lateral wall.

2. The closure of claim 1, wherein the adapter comprises a standoff extending along the longitudinal axis from the lateral wall toward the bracket assembly.

3. The closure of claim 2, wherein each hinge assembly comprises a positioning tab and a release tab.

4. The closure of claim 3, wherein the release tab is extended along the longitudinal axis from the main body farther than the positioning tab.

5. The closure of claim 4, wherein the positioning tab of the hinge assembly is contactable to the standoff at the adapter.

6. The closure of claim 4, wherein the standoff at the adapter contacts the positioning tab of the hinge assembly when the receptacle is rotated from a first position to a second position.

7. The closure of claim 4, wherein the standoff at the adapter moves along a tapered front surface of the positioning tab when rotating the receptacle from the first position to the second position.

8. The closure of claim 7, wherein standoff at the adapter rests in contact with a rear surface of the positioning tab when the receptacle is in the second position.

9. The closure of claim 1, wherein the pair of pivot arms comprises a protrusion, and wherein each hinge assembly comprises a depression at which the protrusion is receivable.

10. The closure of claim 9, wherein the receptacle is rotatable between a first position and a second position, wherein the receptacle is aligned along the longitudinal axis in the first position, and wherein the receptacle is aligned along the transverse axis or an angle between the longitudinal axis and the transverse axis in the second position.

11. The closure of claim 1, wherein the standoff extends along the longitudinal axis less than a position of a protrusion at the pivot arm.

12. The closure of claim 1, wherein the pair of arms forms a notch extending inward into the arm along the transverse axis.

13. The closure of claim 12, wherein a pair of arms extends along the longitudinal axis from a rear end of the receptacle, the pair of arms of the receptacle positioned outward of the pair of arms of the adapter along the lateral axis.

14. The closure of claim 13, a cross member extends along the lateral axis between the pair of arms of the receptacle, and wherein the notch at the adapter is configured to receive the cross member of the receptacle.

15. The closure of claim 13, wherein each arm of the adapter is contoured from the notch to a tab extending along the transverse axis, and wherein the tab comprises a face extending along the longitudinal axis co-planar to an upper face at the lateral wall.

16. The closure of claim 15, wherein a step is formed along the longitudinal axis between the tab and the notch, wherein the step is inward along the transverse axis between the notch and the tab.

17. The closure of claim 16, wherein the receptacle comprises a step extending along the lateral axis between each pivot arm, wherein the step extends inward toward the respective pair of pivot arms, and wherein the step is positioned along the longitudinal axis between the cross member and the base wall at the receptacle.

18. The closure of claim 17, wherein the step at the receptacle is positioned between the tab at the adapter and the cross member at the receptacle, and wherein the tab is positioned between the base wall and the step at the receptacle.

19. A fiber optic closure, the closure comprising:
   an organizing tray comprising a plurality of sidewalls extending along a longitudinal axis between a first end and a second end, wherein the first end forms an open end such that a cable is extendable to or from an interior of the organizing tray, the organizing tray comprising a base wall extending from the plurality of sidewalls along the longitudinal axis and a lateral axis, wherein the base wall forms a plurality of apertures at the first end, the organizing tray comprising an end wall extending along the lateral axis between the plurality of sidewalls, wherein the organizing tray forms the interior between the plurality of sidewalls, the base wall, and the end wall, wherein the organizer tray is rotatable between a first position and a second position, wherein the organizing tray is aligned along the longitudinal axis in the first position, and wherein the organizing tray is aligned along the transverse axis or an angle between the longitudinal axis and the transverse axis in the second position, the organizing tray comprising a pair of arms extending along the longitudinal axis from a rear end of the organizing tray;
   a bracket assembly extending along a transverse axis, the bracket assembly comprising a main body and a plurality of hinge assemblies, wherein the plurality of hinge assemblies is spaced apart in a linear array along the transverse axis, wherein each hinge assembly comprises a depression; and an adapter connectable to the organizing try and the bracket assembly, the adapter comprising a pair of pivot arms connectable to the bracket assembly, the pair of pivot arms extending along the longitudinal axis from a lateral wall extending along the lateral axis, the lateral wall attachable to the organizer tray via a pair of arms extending along the longitudinal axis from the lateral wall, wherein the pair of pivot arms comprises a protrusion receivable at the depression at the hinge assembly, the pair of arms of the organizing tray positioned outward along the lateral axis of the pair of arms of the adapter.

20. The closure of claim 19, wherein:

the adapter comprises a standoff extending along the longitudinal axis from the lateral wall toward the bracket assembly, each hinge assembly comprises a positioning tab and a release tab, the release tab is extended along the longitudinal axis from the main body farther than the positioning tab, the standoff at the adapter contacts the positioning tab of the hinge assembly when the organizer tray is rotated from the first position to the second position.

* * * * *